US010368259B2

(12) United States Patent
Baroudi et al.

(10) Patent No.: US 10,368,259 B2
(45) Date of Patent: *Jul. 30, 2019

(54) METHOD FOR DETERMINING SENSOR NETWORK DELAY TIME

(71) Applicant: KING FAHD UNIVERSITY OF PETROLEUM AND MINERALS, Dhahran (SA)

(72) Inventors: Uthman Baroudi, Dhahran (SA); Anas Abdelwahid Al-Roubaiey, Dhahran (SA); Samir Mekid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,824

(22) Filed: Jun. 21, 2018

(65) Prior Publication Data

US 2018/0352456 A1 Dec. 6, 2018

Related U.S. Application Data

(63) Continuation of application No. 15/059,370, filed on Mar. 3, 2016, now Pat. No. 10,034,185.
(Continued)

(51) Int. Cl.
*H04W 24/08* (2009.01)
*H04W 72/12* (2009.01)
(Continued)

(52) U.S. Cl.
CPC ......... *H04W 24/08* (2013.01); *H04L 41/0893* (2013.01); *H04L 41/12* (2013.01);
(Continued)

(58) Field of Classification Search
CPC ....... H04W 24/08; H04W 24/02; H04W 4/70; H04W 84/18; H04L 41/0893; H04L 41/12; H04L 43/0852
See application file for complete search history.

(56) References Cited

U.S. PATENT DOCUMENTS 8,811,188 B1* 8/2014 Bagchi ................. H04L 9/0822
370/241
2013/0111050 A1* 5/2013 Ziegler ............... H04L 12/4633
709/230

FOREIGN PATENT DOCUMENTS

CN 103179628 A 6/2013
CN 103228023 A 7/2013
(Continued)

OTHER PUBLICATIONS

Baroudi, U., et al., "Delay Characterization and Performance Evaluation of Cluster-Based WSN with Different Deployment Distributions", Future Generation Computer Systems, vol. 39, 12 Pages total, (Mar. 31, 2014).
Anu Infancia, J., et al., "Performance Evaluation of Cluster-Based WSN with Different Deployment Distributions", International Journal of Advanced Research Trends in Engineering and Technology, vol. 2, No. 1, 3 Pages total, (Mar. 2015).
(Continued)

*Primary Examiner* — Kiet Tang
(74) *Attorney, Agent, or Firm* — Oblon, McClelland, Maier & Neustadt, L.L.P.

(57) ABSTRACT

A method for evaluating performance of a sensor network. The method includes selecting, a sensor distribution pattern for a geographical region and determining a location for a base station. A plurality of sensor clusters are generated, each sensor cluster being formed by one of a first and second grouping mechanism. Further, the method allocates, for each sensor a time-slot within a time-frame to transmit a data packet from the sensor to the base station, and evaluates the performance of the first grouping mechanism and the second grouping mechanism for the selected sensor distribution pattern and base station location, by computing at least a ratio of delivered data packets to the base station to a total energy consumption, and a first delay and a second delay incurred by each data packet.

7 Claims, 17 Drawing Sheets

Related U.S. Application Data

(60) Provisional application No. 62/141,058, filed on Mar. 31, 2015.

(51) Int. Cl.
    *H04L 12/46*     (2006.01)
    *H04L 9/08*     (2006.01)
    *H04L 12/26*     (2006.01)
    *H04W 4/70*     (2018.01)
    *H04W 24/02*     (2009.01)
    *H04L 12/24*     (2006.01)
    *H04W 84/18*     (2009.01)

(52) U.S. Cl.
    CPC .......... *H04L 43/0852* (2013.01); *H04W 4/70* (2018.02); *H04W 24/02* (2013.01); *H04W 84/18* (2013.01)

(56) References Cited

FOREIGN PATENT DOCUMENTS

| WO | WO 2011095884 | 8/2011 | |
|---|---|---|---|
| WO | WO-2011095884 A1 * | 8/2011 | .......... H04W 72/121 |

OTHER PUBLICATIONS

Nouh, S., et al., "Effect of Node Distributions on Lifetime of Wireless Sensor Networks", Institute of Electrical and Electronics Engineers, pp. 434-439, (2010).

Deosarkar, B. P., et al., "Joint Optimization of Number of Clusterheads and Spreading Factor for Network Lifetime of Low Energy Adaptive Clustering Hierarchy", Institute of Electrical and Electronics Engineers, 5 Pages total, (2010).

Wang, D., et al., "Coverage and Lifetime Optimization of Wireless Sensor Networks with Gaussian Distribution", IEEE Transactions on Mobile Computing, vol. 7, No. 12, pp. 1444-1458, (Dec. 2008).

Lian, J., et al., "Data Capacity Improvement of Wireless Sensor Networks Using Non-Uniform Sensor Distribution", International Journal of Distributed Sensor Networks, vol. 2, pp. 121-145, (2006).

Heinzelman, W.B., "Application-Specific Protocol Architectures for Wireless Networks", Massachusetts Institute of Technology, 154 Pages total, (Jun. 2000).

Heinzelman, W.R., "Energy-Efficient Communication Protocol for Wireless Microsensor Networks", Hawaii International Conference on System Sciences, pp. 660-670, (Jan. 2000).

Heinzelman, W.B., "An Application-Specific Protocol Architecture for Wireless Microsensor Networks", IEEE Transactions on Wireless Communications, vol. 1, No. 4, 11 Pages total, (Oct. 2002).

* cited by examiner

METHOD FOR DETERMINING SENSOR NETWORK DELAY TIME

CROSS-REFERENCE TO RELATED APPLICATIONS

The present application is a continuation of Ser. No. 15/059,370, now allowed, having a filing date of Mar. 3, 2016, which claims benefit of priority to U.S. provisional application No. 62/141,058, having a filing date of Mar. 31, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Provisioning of quality of service (QoS) is the ultimate goal for any wireless sensor network (WSN). Several factors can influence this requirement such as the adopted cluster formation algorithm. Almost all WSNs are structured based on grouping the sensors nodes into clusters. Not all contemporary cluster formation and routing algorithms are designed to provide/sustain certain QoS requirement such as delay constraint. Another fundamental design issue is that, these algorithms are built and tested under the assumption of uniformly distributed sensor nodes. However, this assumption is not always true. In some industrial applications and due to the scope of the ongoing monitoring process, sensors are installed and condensed in certain areas, while they are widely separated in other areas. Also unlike the random deployment distributions, there are several applications that need deterministic deployment of sensors like grid distribution.

A wireless sensor network (WSN) includes spatially distributed, autonomous, and battery-powered sensors to monitor physical or environmental conditions, such as temperature, sound, vibration, pressure, motion or pollutants and to cooperatively pass their data through the network to a main location (i.e., base station or sink). Recently, as described by I. F. Akyildiz et al. in "Wireless sensor networks: a survey", Elsevier J. Computing. Networks, (2002) 393-433, which is incorporated herein by reference in its entirety, wireless sensor networks have been used in a wide range of applications such as battlefield surveillance in military applications, industrial process automation (monitoring and controlling), meteorological areas, home appliances, and health applications.

However, wireless sensor nodes have limited resources in terms of processing, storage, and communication capabilities and using existing routing protocols for ad-hoc networks is not efficient. Therefore, power-aware routing protocols such as those described by A. Kemal et. al. in "A survey on routing protocols for wireless sensor networks", Elsevier J. Ad Hoc Netw. 3 (2005) (2005) 325-349, by K. Pavai in "Study of routing protocols in wireless sensor networks, in: Advances in Computing, Control, & Telecommunication Technologies", ACT '09. International Conference, 2009, and by J. N. Al-Karaki in "Routing techniques in wireless sensor networks: a survey", IEEE Wireless Commun. (2004), each of which is incorporated herein by reference in their entirety, have been proposed and several surveys and comparison studies have been conducted.

All these studies have explored the performance of routing protocols under the assumption of uniformly distributed or deployed sensor nodes in the area of interest. However, this assumption is not always true especially in industrial networks where the ongoing applications determine the location of a sensor node to monitor and control a specific region or a machine, whereas in military applications it might be deployed by throwing them from a plane that may resemble a normal distributed scenario.

A few non-uniform deployment strategies have been studied in past published works. However, none of them have studied the impact of sensor distributions on WSN routing protocols. A primary focus of the above stated works was on increasing the total data capacity by only considering the energy spent on the data transmission. Further, J. Lian, et. al. in "Data capacity improvement of wireless sensor networks using non-uniform sensor distribution", Int. J. Distrib. Sen. Netw. 2 (2) (2006) 121-145, incorporated herein by reference in its entirety, presented a finding that in a uniformly distributed homogeneous WSN with a static base station, after the lifetime of the network is over, up to 90% of the total initial energy remains unused. The authors proposed a non-uniform sensor distribution strategy by adding more nodes to the heavier energy load area, and thereby maximizing the network lifetime by balancing the energy consumption over nodes. The simulation results showed that the strategy can increase the total data capacity by an order of magnitude.

Wu et al. in "On the Energy Hole Problem of Non-uniform Node Distribution in Wireless Sensor Networks", Third IEEE Int'l Conf. Mobile Ad-hoc and Sensor Systems, MASS '06, October 2006, pp. 180-187, and incorporated herein by reference in its entirety, address the energy hole problem in WSNs with non-uniform node distribution. The authors investigated the theoretical aspects of the non-uniform node distribution strategy, which aim to avoid the energy hole around the sink. They assumed that each sensor generates data for each data collection period, which may not be true for highly dense WSNs. They provided a non-uniform node distribution strategy, which makes the number of nodes increases with geometric proportion from the outer parts to the inner parts of the network, which looks like normal distribution. Simulation experiments demonstrated that when the network lifetime has ended, the nodes in the inner parts of the network achieve nearly balanced energy depletion, and only less than 10% of the total energy is wasted. Liu et al. proposed in their work "Power-aware node deployment in wireless sensor networks", Int. J. Distrib. Sen. Netw. 3 (2007) 225-241, incorporated herein by reference in its entirety, a non-uniform deployment scheme based on a general sensor application model. They derived a function to determine the number of nodes as a function of the distance from the sink. They also assumed that each sensor is required to report the data back to the sink. Simulations show that their method can enhance the network lifetime.

All these non-uniform deployment strategies focused on accurately controlling the location of sensors in the network domain for achieving a higher lifetime. In some real applications, it is hard to strictly control the number of nodes in a given domain, e.g., the sensors that are dropped from a helicopter or a low-flying unmanned aerial vehicle. Zou and Chakraborty suggested in "Uncertainty-aware and coverage-oriented deployment for sensor networks", J. Parallel Distrib. Comput. 64 (2004) 788-798, incorporated herein by reference in its entirety, the placement of airdropped sensors as 2D Gaussian distribution without giving any specific results.

Wang et al. in "Coverage and lifetime optimization of wireless sensor networks with Gaussian distribution", IEEE Trans. Mob. Comput. 7 (12) (2008), incorporated herein by reference in its entirety argued that an appropriate strategy can be employed when dropping sensors from a plane to have the standard deviation of the 2D Gaussian distribution. For instance, this can be performed by controlling the height of the plane or using some specific devices to eject sensors with different circular angles. Therefore, distribution of sensors could satisfy 2D Gaussian distribution and follows a predefined standard deviation with the center point at the drop point of the helicopter. As such, it enables sensors to have a higher probability to be deployed near the drop point than the uniform deployment. The benefit in doing so, is that it relaxes the energy-hole problem and increases the WSN lifetime. Further, the authors investigated the Gaussian distribution as a deployment strategy in WSNs. Their study was focused on two important design factors: deployment strategy, and the lifetime and coverage. In this work, they have provided theoretical formulations for lifetime and coverage in a WSN based on 2D Gaussian distribution. Two types of dispersions are considered, $\sigma x = \sigma y$ and $\sigma x \neq \sigma y$. The analytical model captures the intrinsic properties of the coverage and the lifetime by using various parameters. The authors showed that the Gaussian distribution can effectively increase the lifetime. The analytical results could serve as the WSN design guideline. For this purpose, they have developed two algorithms to compute the optimal deployment strategy and show that the optimal deployment strategy can be obtained in a polynomial time complexity. Although they came out of the general nature of previous studies by including a non-uniform distribution in their study, their study did not describe or suggest, at least, the impact of Gaussian distribution deployment on the existence WSN routing protocols.

Wu and Chen proposed in "A Partition-Based Hybrid Clustering Routing Protocol for WSN", in: Proc. IEEE International Conference of Internet Technology and Applications, iTAP, August 2011, and incorporated herein by reference in its entirety, a partition-based hybrid clustering routing protocol (named PHCR). To address the problem that the cluster-heads are distributed unevenly in the network, they divided the network monitored area into several sectors through the partition algorithm. In the first round, the sensor node which is the nearest to the area center is selected as the cluster heads by the sink node, and the other nodes in each sector become the member nodes. The sensor node which is the second closest to the sector center is selected as the cluster head for the second round. After the second round, the cluster head of the next round is chosen by the prior cluster head of its own cluster. Simulation results showed that PHCR has improved the network lifetime effectively.

Sara et al. described in "Effect of node distributions on lifetime of Wireless Sensor Networks", in: Industrial Electronics (ISIE), 2010 IEEE International Symposium on, 4-7 Jul. 2010, pp. 434-439, and incorporated herein by reference in its entirety, the effect of node distributions on lifetime of WSNs. However their work focuses on prolonging the network lifetime by investigating different node deployments including both geometric and uniform. Geometric distributions are represented by star topologies with different variations of number of star brunches and number of nodes in each brunch. It was ascertained in this work that the 3×33 star resulted in the highest network lifetime for a 100×100 m and furthermore it produced 4612 cycles, exceeding random distributions results by 1212 cycles.

Peng et. al. in "Impacts of sensor node distributions on coverage in sensor networks", Elsevier J. Parallel Distrib. Comput. (2011), and incorporated herein by reference in its entirety, studied the impact of sensor node distributions on coverage in sensor networks as the coverage is an important QoS measurement for many sensor network applications. They showed the impact on network coverage by adopting different sensor node distributions through both analytical and simulation studies. They observed that assuming different sensor distributions may lead to significant differences in coverage estimation. They adopted a distribution-free approach to study network coverage, in which no assumption of probability distribution of sensor node locations is needed. Although they only studied the network coverage, they claimed that their methodology can be generalized and extended to estimate other sensor network performance metrics.

Lin et al. in "Balancing energy consumption with mobile agents in wireless sensor networks, Elsevier J. Future Generation. Comput. Syst. 28 (2012) 446-456", incorporated herein by reference in its entirety, investigated the problem of energy consumption balance during data collection in WSNs and they showed that for a sensor network with uniform node distribution and constant data reporting, balancing the energy of the whole network cannot be realized when the distribution of data among sensor nodes is unbalanced. The authors also showed that in order to obtain better performance, the cluster structure is better formed based on cellular topology taking into consideration the energy balancing of inter-cluster and intra-cluster environments.

Hock et al. in "Energy Efficient Routing for Wireless Sensor Networks with Grid Topology", in: IFIP International Federation for Information Processing, 2006, pp. 834-843, incorporated herein by reference in its entirety, performed intensive survey and classification for the previous works on cluster-based WSN. They presented a taxonomy and general classification of published clustering schemes. Also they demonstrated different clustering algorithms for WSNs; highlighting their objectives, features, complexity; and comparing these clustering algorithms based on metrics such as convergence rate, cluster stability, cluster overlapping, location awareness and support for node mobility.

Other studies on WSN clustering by Abbasi and Younis (described in "A survey on clustering algorithms for wireless sensor networks", Elsevier J. Comput. Commun. 30 (2007) 2826-2841, and incorporated herein by reference in its entirety) and by Liu et. al. (described in "A survey on clustering routing protocols in wireless sensor Netw., Sensors (2012) 11113-11153, and incorporated herein by reference in its entirety) highlighted the challenges in clustering a WSN, and discussed the design rationale of the different clustering approaches, several key issues that affect the practical deployment of clustering techniques in sensor network applications. The able works systematically analyzed a few of WSN clustering routing protocols and compared these different approaches according to their taxonomy and several significant metrics, such as inter and intra-cluster routing, cluster head election, mobility, and uniformity of cluster sizes.

Liu et al. took another direction and analyzed the communication energy consumption of the clusters and the impact of node failures on coverage with different densities. A distributed algorithm that considers both energy and topological features of the sensor network was proposed. It aimed at selecting the smallest set of nodes with more neighbors as the cluster heads to cover the whole. The algorithm requires neither time synchronization nor knowledge of a node's geographic location. Simulation results showed that the proposed algorithm can prolong the network lifetime and improve network coverage effectively in comparison with EECF, LEACH. However, selecting small set of cluster heads leads to larger cluster size and hence higher intra-cluster delay.

Accordingly, the present disclosure provides for a framework to evaluate the performance of wireless sensor networks and further determine the impact of distributions of sensor deployments.

SUMMARY

An aspect of the present disclosure provides for a method of operating a computer system to determine the performance of a wireless sensor network, the method comprising: selecting, a sensor distribution pattern for a geographical region where the sensors are to be deployed; determining a location for a base station in the geographical region; generating by circuitry, a plurality of sensor clusters, each sensor cluster of the plurality of sensor clusters being formed by one of a first grouping mechanism and a second grouping mechanism, the first grouping mechanism forming the sensor cluster based on a strength of a signal transmitted by each sensor, that is received by the base station, and the second grouping mechanism forming the sensor cluster based on a location of the sensor and an energy level of the sensor; allocating, for each sensor included in the generated sensor cluster, a time-slot within a time-frame corresponding to the sensor cluster, the time-slot being utilized for transmitting a data packet from the sensor to the base station; and evaluating by circuitry, the performance of the first grouping mechanism and the second grouping mechanism for the selected sensor distribution pattern and base station location, by computing at least a ratio of delivered data packets to the base station to a total energy consumption, and a first delay and a second delay incurred by each data packet.

Another aspect of the present disclosure provides for a non-transitory computer readable medium having stored thereon a program that when executed by a computer causes the computer to execute a method to determine the performance of a wireless sensor network, the method comprising: selecting, a sensor distribution pattern for a geographical region where the sensors are to be deployed; determining a location for a base station in the geographical region; generating by circuitry, a plurality of sensor clusters, each sensor cluster of the plurality of sensor clusters being formed by one of a first grouping mechanism and a second grouping mechanism, the first grouping mechanism forming the sensor cluster based on a strength of a signal transmitted by each sensor, that is received by the base station, and the second grouping mechanism forming the sensor cluster based on a location of the sensor and an energy level of the sensor; allocating, for each sensor included in the generated sensor cluster, a time-slot within a time-frame corresponding to the sensor cluster, the time-slot being utilized for transmitting a data packet from the sensor to the base station; and evaluating the performance of the first grouping mechanism and the second grouping mechanism for the selected sensor distribution pattern and base station location, by computing at least a ratio of delivered data packets to the base station to a total energy consumption, and a first delay and a second delay incurred by each data packet.

According to another aspect of the present disclosure is provided a device comprising: circuitry configured to select a sensor distribution pattern for a geographical region where the sensors are to be deployed, determine a location for a base station in the geographical region, generate a plurality of sensor clusters, each sensor cluster of the plurality of sensor clusters being formed by one of a first grouping mechanism and a second grouping mechanism, the first grouping mechanism forming the sensor cluster based on a strength of a signal transmitted by each sensor, that is received by the base station, and the second grouping mechanism forming the sensor cluster based on a location of the sensor and an energy level of the sensor, allocate for each sensor included in the generated sensor cluster, a time-slot within a time-frame corresponding to the sensor cluster, the time-slot being utilized for transmitting a data packet from the sensor to the base station, and evaluate the performance of the first grouping mechanism and the second grouping mechanism for the selected sensor distribution pattern and base station location, by computing at least a ratio of delivered data packets to the base station to a total energy consumption, and a first delay and a second delay incurred by each data packet.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF EMBODIMENTS

Figure 1:
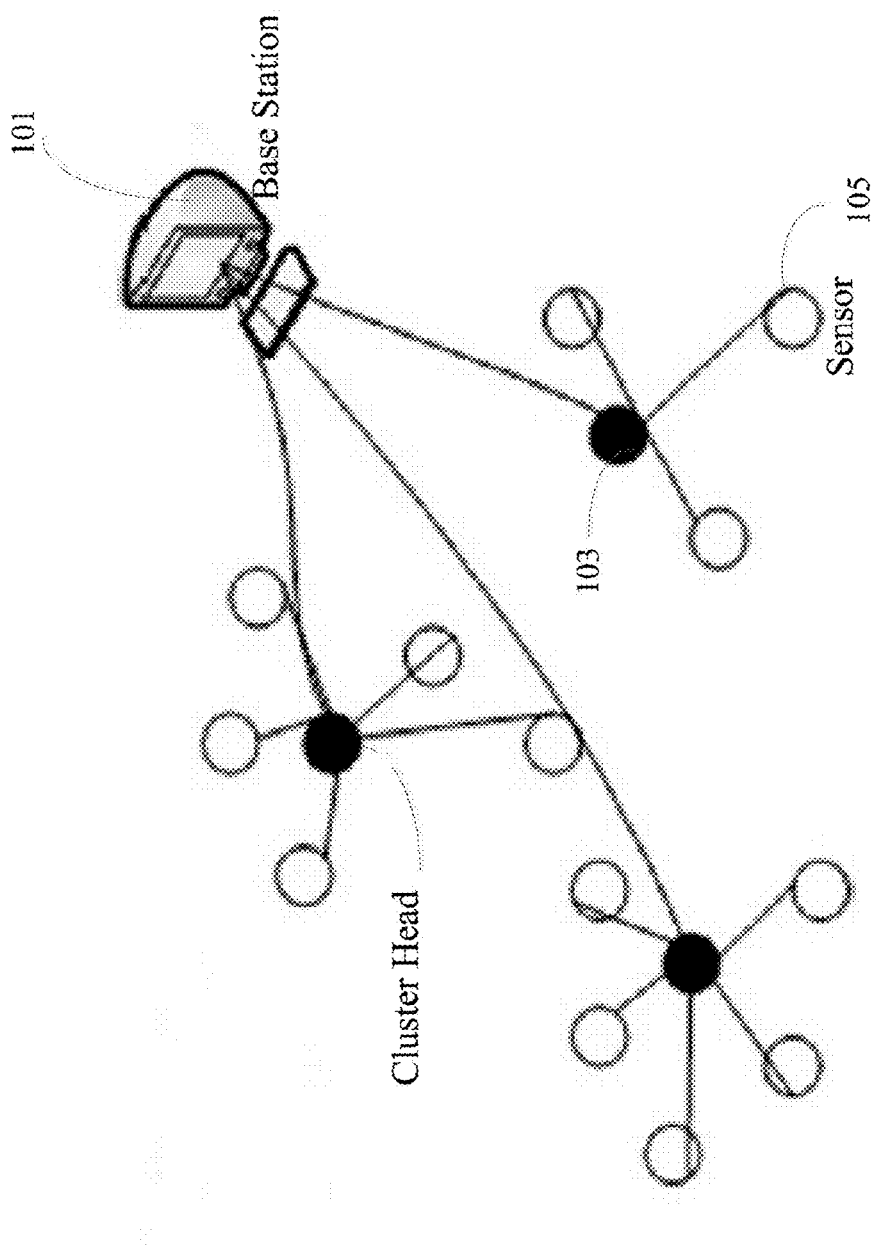
FIG. 1 illustrates an exemplary cluster-head formation.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

In what follows a presented a detailed description of the LEACH and LEACH-C protocols used herein to determine the performance of wireless sensor networks. LEACH is Low Energy Adaptive Clustering Hierarchy (LEACH) protocol. LEACH is a clustering-based communication protocol that forms clusters of the sensor nodes based on the received signal strength and use local cluster heads as routers to the sink. In doing so, the LEACH incurs the advantageous ability of saving energy since the transmissions will only be done by such cluster heads rather than all sensor nodes.

FIG. 1 illustrates an exemplary cluster head formation in LEACH. In LEACH, nodes are organized into local clusters, with one node acting as the local base station (BS) or cluster-head 101 as seen in FIG. 1. All the other nodes (sensors) must transmit their data to the cluster heads (103), while the cluster-head nodes must receive data from all the cluster members, perform signal processing functions on the data (e.g., data aggregation), and then transmit data to the remote base station. Because a cluster head is doing much more work and stays on all the time, so being a cluster head is much more energy intensive than being a non-cluster head node. In order to evenly distribute the energy load associated with a cluster head and avoid draining the battery of any one sensor, cluster head position is rotated randomly among all the nodes. The medium access protocol in LEACH is also chosen to reduce energy dissipation in non-cluster-head nodes. Since a cluster head node knows all the cluster members, it can act as a local control center and create a TDMA schedule that allocates time slots for each cluster member. In doing so, the LEACH incurs the advantageous ability of allowing the nodes to remain in the sleep state as long as possible. In addition, using a TDMA schedule prevents intra-cluster collisions.

While there are several advantages for using LEACH, this protocol offers no guarantee about the placement and/or number of cluster head nodes. Since the clustering process is adaptive, obtaining a poor clustering setup during a given round will not greatly affect overall performance. However, using a central control algorithm to form the clusters may produce better clusters by dispersing the cluster head nodes throughout the network. This is the basis for LEACH-centralized (LEACH-C). LEACH-C is a protocol that uses a centralized clustering algorithm and the same steady-state protocol as LEACH.

According to one embodiment, during the setup phase of LEACH-C, each node sends information about its current location (possibly determined using a GPS receiver) and energy level to the BS. In addition to determining good clusters, the BS needs to ensure that the energy load is evenly distributed among all the nodes. To do this, the BS computes the average node energy, and whichever nodes have energy below this average cannot be cluster heads for the current round. Using the remaining nodes as possible cluster heads, the BS finds clusters using the simulated annealing algorithm to solve the NP-hard problem of finding optimal clusters. This algorithm attempts to minimize the amount of energy for the non-cluster head nodes 105 to transmit their data to the cluster head, by minimizing the total sum of squared distances between all the non-cluster head nodes and the closest cluster head.

Once the cluster heads and associated clusters are found, the BS broadcasts a message that contains the cluster head ID for each node. If a node's cluster head ID matches its own ID, the node is a cluster head; otherwise, the node determines its TDMA-slot for data transmission and goes to sleep until it is time to transmit data. The steady-state phase of LEACH-C is identical to that of LEACH.

The impact of sensors deployment on the WSN performance, lifetime and energy consumption has been largely neglected. Accordingly, the present embodiment describes intensive performance evaluations for different sensor deployment distributions in WSN. FIGS. 2A-2D, depicts exemplary four 210-240 (grid, uniform, Normal and exponential) distributions, respectively.

Figure 2A:
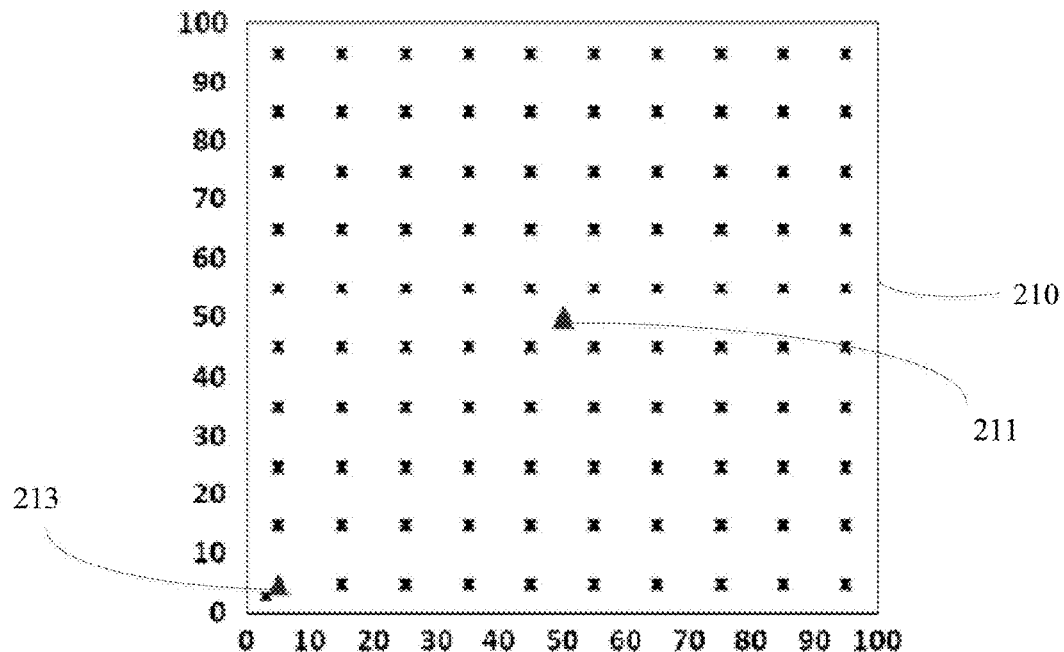
FIGS. 2A-2D illustrate according to an embodiment sensor node deployment for different distributions.

FIG. 2A depicts a grid sensor distribution which represents the deterministic distribution and may be used in several WSN applications, e.g. agricultural and environmental monitoring applications, due to its high performance in terms of network life, energy consumption and delay. In grid topology, the nodes are placed in such a way where the distance between any two adjacent nodes is the same. This makes clustering calculations easier than random distributions. However, many practical WSN applications may not allow deterministic deployment for sensors, such as in disaster and military conditions. In such cases, other distributions (described below) which are drawn from naturally random distributions are more apt.

Figure 2B:
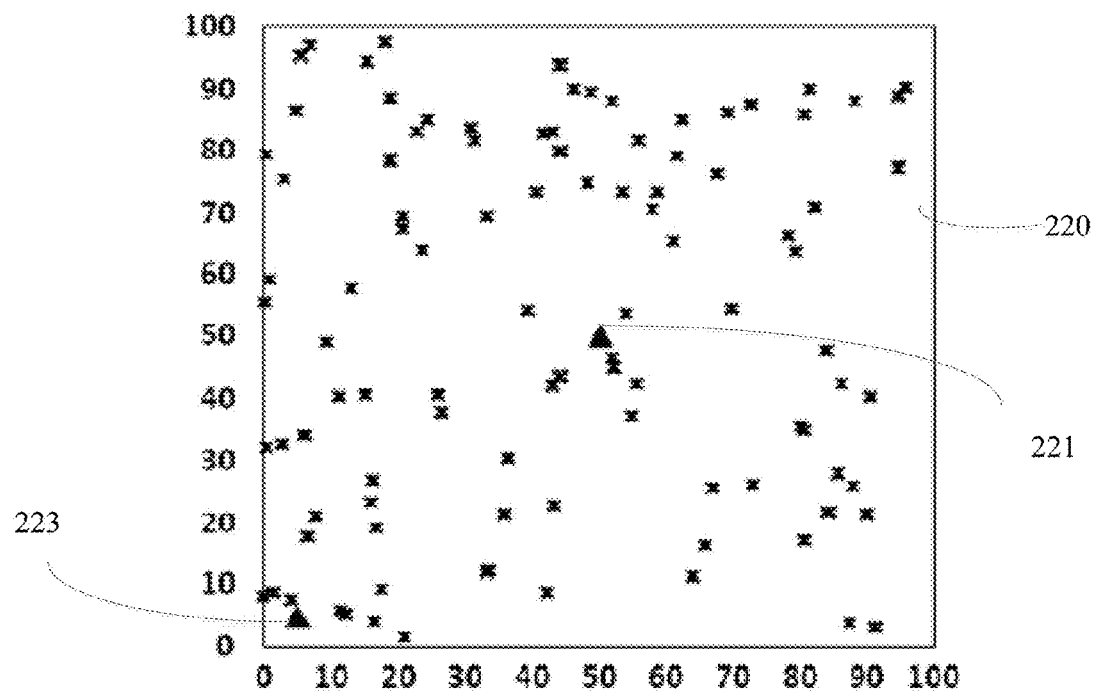
Figure 2C:
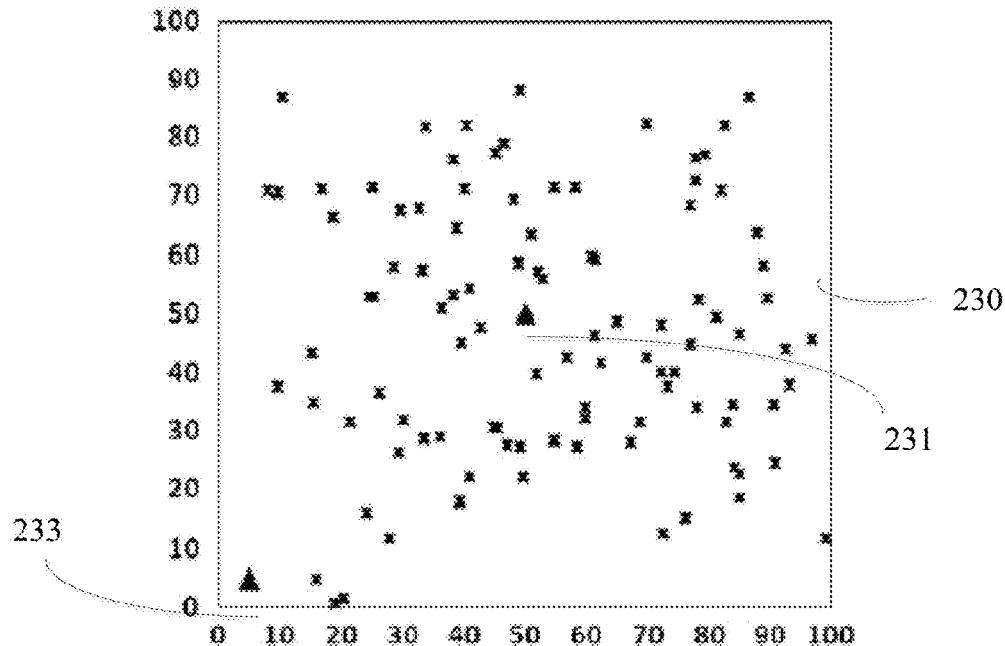
Figure 2D:
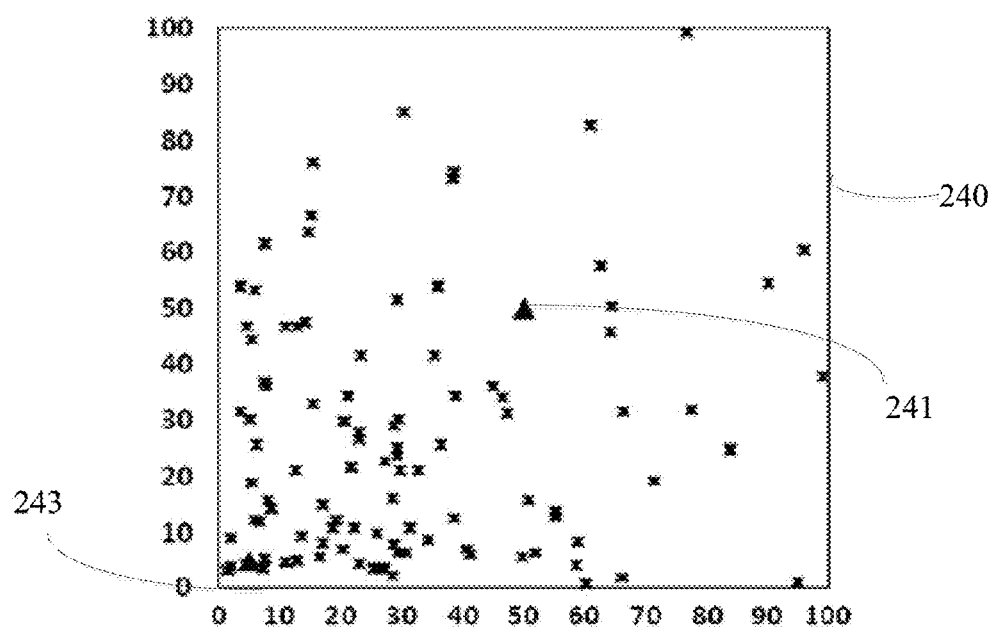

FIG. 2B depicts an exemplary uniform distribution of sensors in the geographical area, whereas FIG. 2C depicts a Normal distribution of sensors, where the majority of nodes are condensed at the center of the field. The Normal distribution parameters are the same for both dimensions i.e., the mean ($\mu_x=\mu_y$) is 50 (since the area is 100×100 m$^2$) and the standard deviation ($\sigma x=\sigma y$) is 25. The exponential distribution is shown FIG. 2D, with $\lambda$ equals 35. In the exponential distribution the majority of the nodes are placed at the corner (bottom left).

According to an embodiment, in order to investigate the impact of base station location on the protocol performance (LEACH/LEACH-C) for the distributions of FIGS. 2A-2D, two scenarios are considered: one where the base station is located in the center of the topology (i.e. (50, 50)), and the other where the base station is located in the corner of the topology. Specifically, as shown in FIGS. 2A-2D, the base station may be located in one of 211, 221, 231, 241 (i.e., at the center) or 213, 223, 233, and 243 (i.e., at the corner) respectively. In this way, by one embodiment, all possible combinations of the distributions with base station locations are evaluated.

To characterize the packet delay, by one embodiment, two main delay parameters that affect the cluster based application performance are considered: the inter-cluster delay and intra-cluster delays, wherein the inter-cluster delay is the delay that a packet suffers when it is transmitted from the cluster head to the base station. According to LEACH, a random access scheme is assumed. Hence, this delay component is unpredictable. On the other hand, the intra-cluster delay is the delay that a packet suffers when it is transmitted from the sensor node to the cluster head. This delay component is deterministic as time-division-multiple-access (TDMA) is adopted.

FIGS. 3A-3D depict exemplary cluster formation 310-340 in the LEACH-C protocol (for 100 nodes with 5% cluster-heads) in a first round of performance evaluation for the four deployment strategies as depicted in FIGS. 2A-2D. It must be appreciated that there are significant differences in the way the sensor nodes are grouped into clusters, although all used LEACH as a cluster formation algorithm. For instance, using grid distribution, the size of clusters is more symmetric and uniform; while in case of exponential distribution, the majority of the clusters is located at the bottom left corner according to the deployment parameter (i.e. $\lambda_x$, $\lambda_y$) which will increase the probability of collisions in that area. Although the other two distributions (normal and uniform) almost have the same cluster distribution, due to the chosen value of normal distribution standard deviation, they differ in the cluster size which impacts the intra-cluster delay as is described later.

Figure 4:
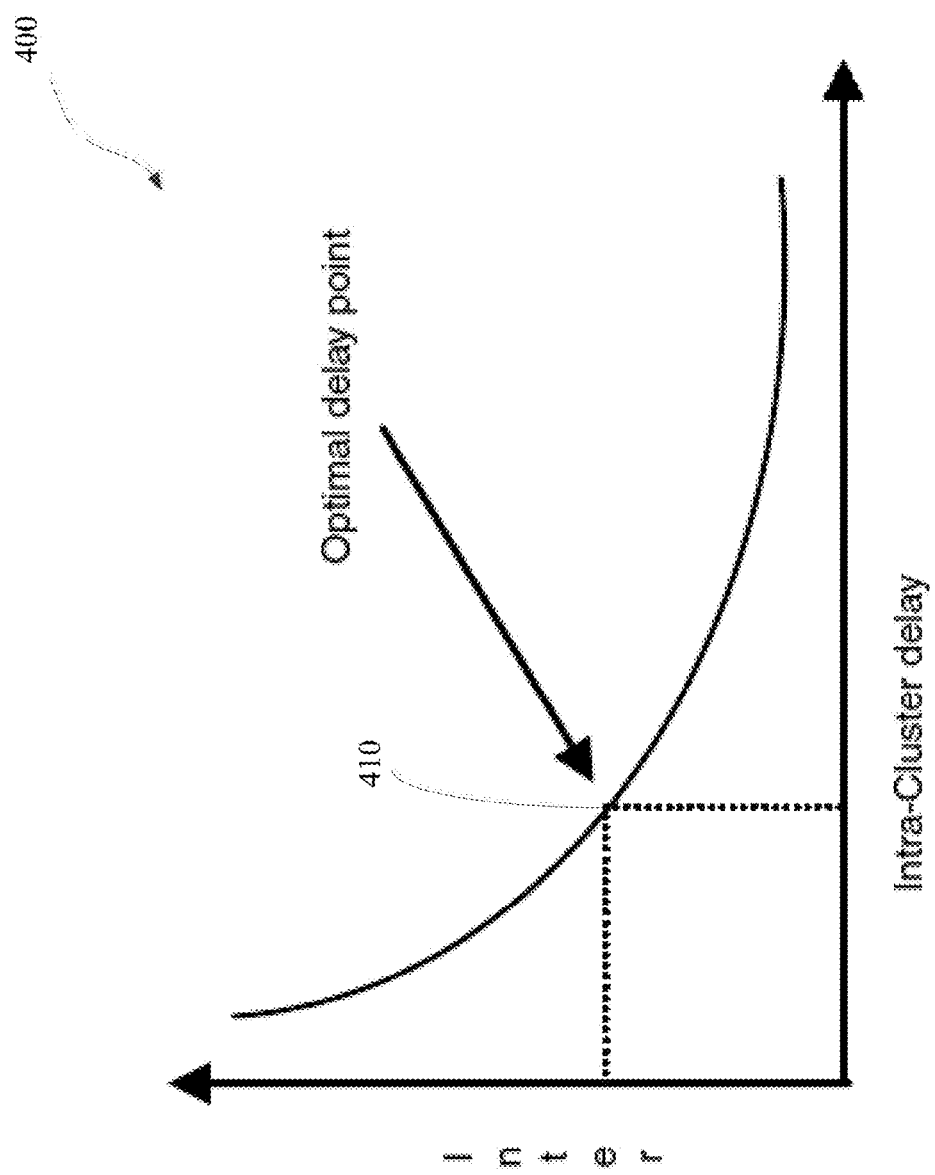
FIG. 4 depicts an exemplary graph illustrating an expected relationship between inter-cluster and intra-cluster delay.

In contrast, increasing the percentage of cluster heads implies decreasing the cluster size, and leads to increasing the inter-cluster delay due to the high probability of collision occurrence. In addition, the intra-cluster delay will decrease due to the small cluster size. In contrast, decreasing the percentage of cluster heads decreases the probability of collisions and consequently, decreases the inter-cluster delay. However, this will be at the expense of increasing the intra-cluster delay due to larger cluster size compared to the previous situation (large cluster heads number). This scenario may result in deferring the delivery of critical data as in the case of intrusion detection network and cause inappropriate action. Therefore, it is a tradeoff problem between two factors: inter-cluster delay and intra-cluster delay, as depicted in the graph 400 of FIG. 4, and the goal is to operate at the optimal delay point 410 that minimizes the total delay.

According to one embodiment, in order to clarify the concept of inter-cluster and intra-cluster delay and its impact, a simulation example of a WSN with 100 nodes with 5% cluster heads for monitoring object movement for security purposes is considered. In each round (simulation instant), different members in each cluster are considered, and such grouping is considered for the entire simulation run. Accordingly, a huge difference is observed among the clusters in terms of intra-cluster delay. Table I shows the size of clusters for each distribution and its corresponding delay components.

Furthermore, from Table I it can be observed that the number of nodes belonging to each cluster differs widely despite of using the same deployment strategy. In one hand, this diversity results in orthogonal transmissions among cluster heads and hence less contention to the medium. In consequence, as in Table 1, all inter-cluster delays are the same for all distributions and corresponding clusters. On the other hand, this result disappears when the cluster head percentage is high.

Additionally, the instantaneous intra-cluster delay varies with number of cluster nodes and all are in range of hundreds of milliseconds. This also shows the importance of decreasing this delay especially for real time applications. It must be appreciated that this situation will last for the whole round. Furthermore, obtaining the average of inter-cluster or intra-cluster delay over the whole network should be avoided by one embodiment, because it hides the instantaneous impact as illustrated below.

As LEACH tries to balance energy consumption among all nodes, the cluster formation changes periodically. Hence, we can compute the average intra-cluster delay by Eq. (1). Then, the cluster size is multiplied by the TDMA slot time, which is constant for all nodes. Thus, from Eq. (1), the intra-cluster delay decreases as the number of cluster heads increases. For example, in cases of 5, 10, and 20, the average delay will be 20, 10, and 5 respectively, (multiplied by slot time).

$$\text{Average cluster size} = \frac{\text{No. of nodes}}{\text{No. of cluster heads}}. \quad (1)$$

On the other hand, the inter-cluster delay increases as number of cluster heads increases. That is because the probability of collisions in CSMA increases as number of senders (cluster heads) increases, due to the high contention on the channel; as a result, the delay dramatically increases. LEACH algorithm and in order to minimize interference from concurrent transmissions from different cluster heads, it uses a simple spreading mechanism where the spreading factor is equal to the number of cluster heads plus one. For example, in case of 5, 10, 20, the average delay obtained by our simulation for grid distribution was, about 36, 122, 9000

TABLE I cluster size and delay components for different deployment distributions.
Cluster size and delay components for different deployment distributions.

| | Upper right corner cluster | | | Upper left corner cluster | | | Bottom right corner cluster | | | Bottom left corner cluster | | | Central cluster | | |
|---|---|---|---|---|---|---|---|---|---|---|---|---|---|---|---|
| | | Delay | | Cluster | Delay | | Cluster | Delay | | Cluster | Delay | | Cluster | Delay | |
| | Cluster size | Intra | Inter | size | Intra | Inter | size | Intra | Inter | size | Intra | Inter | size | Intra | Inter |
| Uniform | 26 | 0.781 | 0.036 | 23 | 0.706 | 0.036 | 16 | 0.529 | 0.036 | 23 | 0.706 | 0.036 | 12 | 0.428 | 0.036 |
| Exponential | 10 | 0.428 | 0.036 | 15 | 0.504 | 0.036 | 16 | 0.529 | 0.036 | 33 | 0.956 | 0.036 | 26 | 0.732 | 0.036 |
| Normal | 11 | 0.403 | 0.036 | 29 | 0.857 | 0.036 | 13 | 0.456 | 0.036 | 22 | 0.680 | 0.036 | 25 | 0.756 | 0.036 |
| Grid | 15 | 0.504 | 0.036 | 20 | 0.630 | 0.036 | 25 | 0.765 | 0.036 | 25 | 0.765 | 0.036 | 15 | 0.504 | 0.036 |

Referring to Table I, consider, for example, the exponential strategy and focus on the bottom left cluster (BLC) and upper right cluster (URC). If an event is detected in BLC, it takes about 33 time-slots to deliver the message to its cluster head, while in URC, it takes 10 time-slots only. This instantaneous delay results in high delay jitter and failure in responding to the event in time.

ms, respectively. Thus, the cluster head number is an important design parameter that significantly affects the network performance in terms of delay and throughput.

According to an embodiment of the present disclosure, in order to evaluate the performance of wireless sensor networks under the LEACH and LEACH-C protocols, first is evaluated the energy efficiency of these two protocols, followed by their performance with respect to different data loads, and finally the effect of the cluster size, number of cluster heads, and number of nodes on the inter and intra-cluster delays is investigated.

By one embodiment, in order to evaluate the WSNs, the NS-2 simulator is utilized. Considering the availability of data for transmission in each sensor node, is emulated this phenomenon by forcing the sensor node to sleep 0%, 25%, 50%, and 75% of the TDMA frame cycle, where 0% means that the entire time slots are occupied with signals, i.e., none of them are empty. The energy model and other simulation parameters are summarized below in Tables II and III.

TABLE II simulation parameters.
Simulation parameters.

| Parameter | Value |
| --- | --- |
| Simulation time | 500 s |
| Number of nodes | 50, 100, 150, 200, 250 |
| Simulation area | 100 × 100 m² |
| Number of runs per scenario | 10 times |
| Base stations' positions | Corner (5, 5) & Center (50, 50) |
| Number of cluster heads | 5% of number of nodes |
| Round time | 50 s |
| Data signal size | 525 bytes |
| Channel BW | 1 Mbps |

TABLE III

Energy model parameters.
Energy model parameters.

| Parameter | Value |
| --- | --- |
| Initial energy | 5 J |
| Electronics energy | 50 nJ/bit |
| Receive threshold | 1 nJ |
| Success threshold | 6 nJ |
| Data aggregation energy | 5 nJ/bit/signal |

By one embodiment, in order to evaluate the performance with different network conditions, different number of nodes to represent the sparse (light load, 50 nodes) and dense networks (heavy load, 250 nodes) are selected. Further, in order to measure the performance of LEACH and LEACH-C, the ratio of total delivered packets to the base station to the total energy consumption (packet/joule) is computed. The metric is more practical that the typical measure (i.e. total packets or total energy) as it combines two measures in one and gives how much energy (including routing exchanged information packets, cluster formation packets, etc.) should be invested to get a data packet at the base station. Additionally, to ensure high confidence in the obtained results, for each point in the curves (described below), ten random topologies for each distribution are developed and then averaged to obtain the final results.

In what follows is described a performance comparison of the LEACH and LEACH-C routing protocols for varying sensor deployments. For sake of clarity, the following abbreviations are used herein: leachCnNd-Leach, center BS and normal distribution, leachCrNd-Leach, corner BS and normal distribution, leachCnUd-Leach, center BS and uniform distribution, leachCrUd-Leach, corner BS and uniform distribution, leachCnEd-Leach, center BS and exponential distribution, leachCrEd-Leach, corner BS and exponential distribution, leachCnGd-Leach, center BS and Grid distribution, and leachCrGd-Leach, corner BS and Grid distribution.

According to one embodiment, the following simulation results are observed: determining the impact of different random distributions on LEACH where the base station is located either at the center or at the corner on energy consumption assuming exhaustive data transmission. Further, the energy efficiency for the routing protocols under different data rates for the sensor nodes is evaluated, followed by the effect of different deployment distributions on the inter/intra-cluster delays.

Table IV summarizes the improvement over uniform distribution of sensors. The presented numbers are normalized values compared to the performance under uniform assumption. The minus sign (−) indicates performance degradation, whereas the positive sign (+) indicates performance improvement compared to uniform distribution. It can be observed that on average the improvement is much more than the degradation, for example the improvement can reach as high as 42%, and 66% in case of normal and grid distributions, respectively.

TABLE IV comparison of sensor deployment strategies.

| No. of nodes | Exponential | | Normal | | Grid | |
| --- | --- | --- | --- | --- | --- | --- |
|  | CrBS | CnBS | CrBS | CnBS | CrBS | CnBS |
| 50 | 25% | −24% | 35% | 18% | 66% | −29% |
| 100 | −9% | 23% | −16% | −1% | −8% | −11% |
| 150 | 18% | 12% | 42% | 21% | 55% | 5% |
| 200 | −15% | −2% | −31% | 12% | 19% | 91% |
| 250 | −18% | −29% | −3% | −18% | 10% | −7% |

LEACH - Improvement compared to uniform deployment;
CrBS: the base station is located in the corner,
CnBS: the base station is located in the corner.

Figure 5:
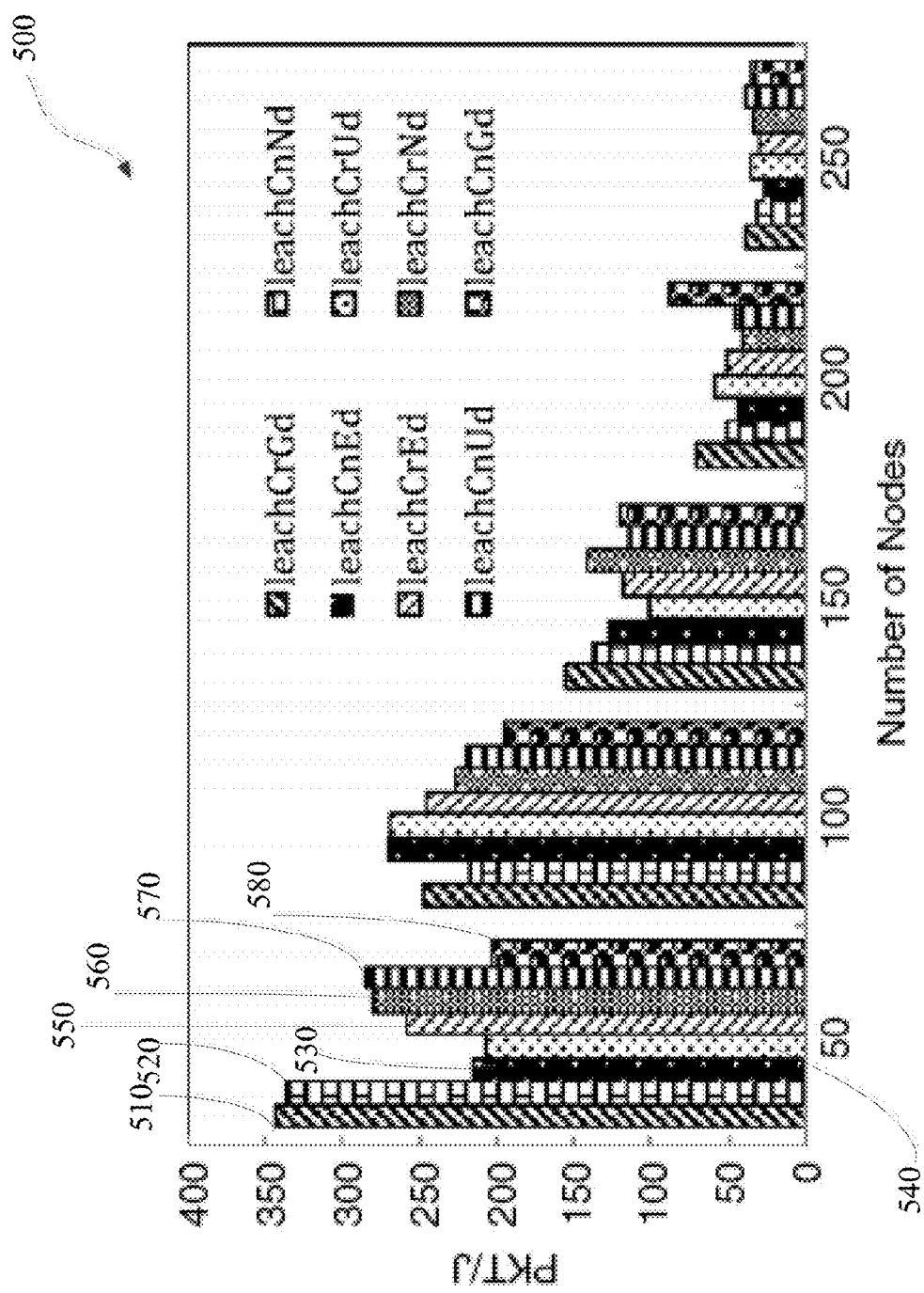
FIG. 5 depicts an exemplary bar graph depicting the performance of LEACH with different sensor distributions and base station locations.
Figure 6:
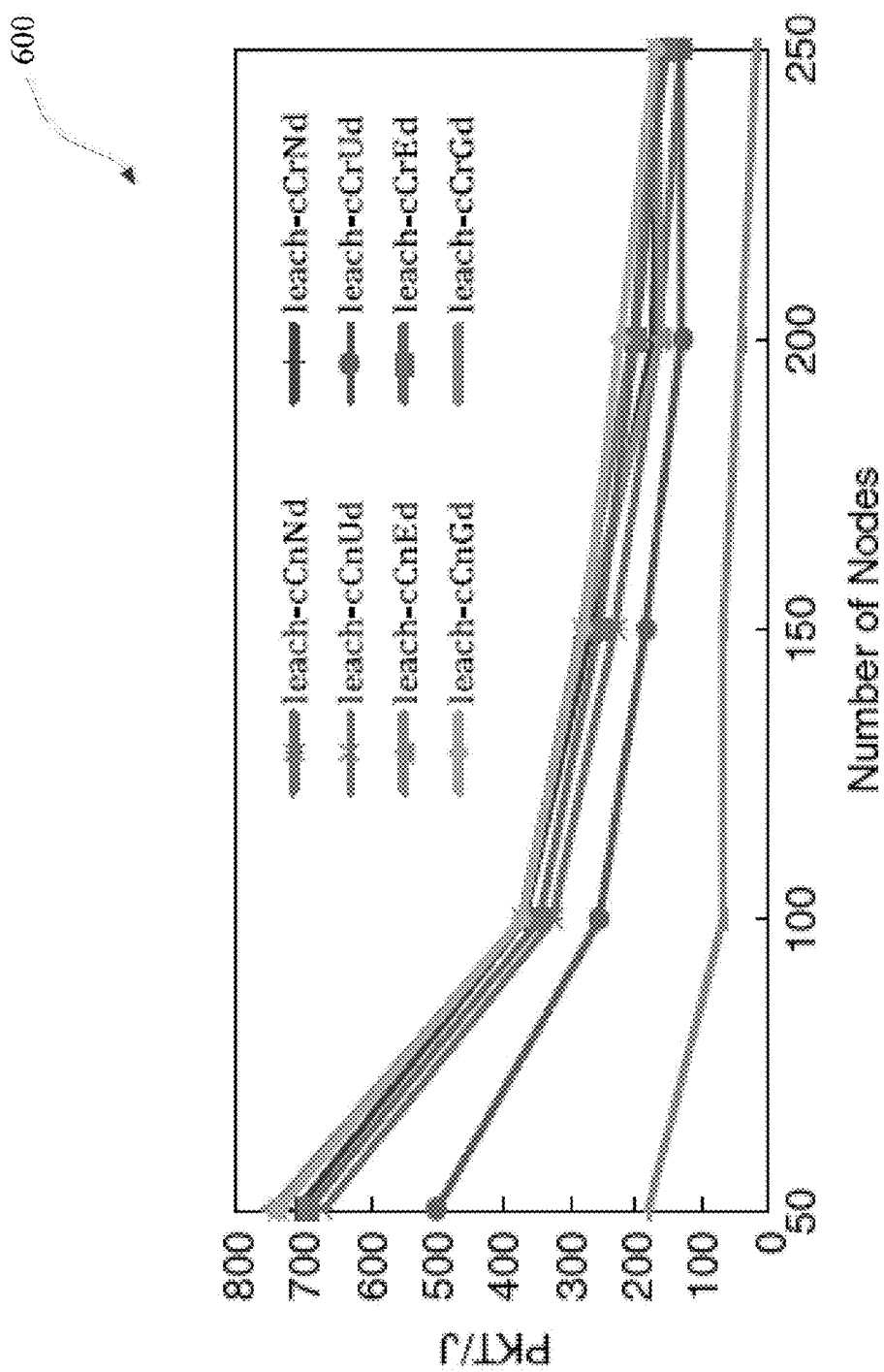
FIG. 6 depicts an exemplary graph depicting the performance of the LEACH-C with different sensor distributions and base station locations.

In contrast, considering LEACH-C routing protocol, we can observe its consistency in achieving better performance as shown in FIGS. 5 and 6. FIG. 5 depicts an exemplary bar graph depicting the performance of LEACH with different sensor distributions and base station locations and FIG. 6 depicts an exemplary graph depicting the performance of the LEACH-C with different sensor distributions and base station locations.

In FIG. 5 the bars 510-580 correspond to the performance of leachCrGd, leachCnNd, leachCnEd, leachCrUd, leachCrEd, leachCrNd, leachCnUd, and leachCnGd.

Moreover, LEACH-C always outperforms LEACH due to the centralized clustering algorithm in LEACH-C. For example, for 50-node topology, LEACH-C can deliver around 700 packets per joule; whereas in case of LEACH, the maximum is around 300 packets per joule which is nearly half of LEACHC. This result can be attributed to the centralized cluster heads selection which yields better load balancing over network nodes. Also, in both protocols as we increase the number of nodes the performance degrades, that is due to the increase of data collisions and retransmissions. However, in some cases such as LEACH uniform distribution, the best case was in 100 nodes where the network approaches its peak performance.

Figure 3A:
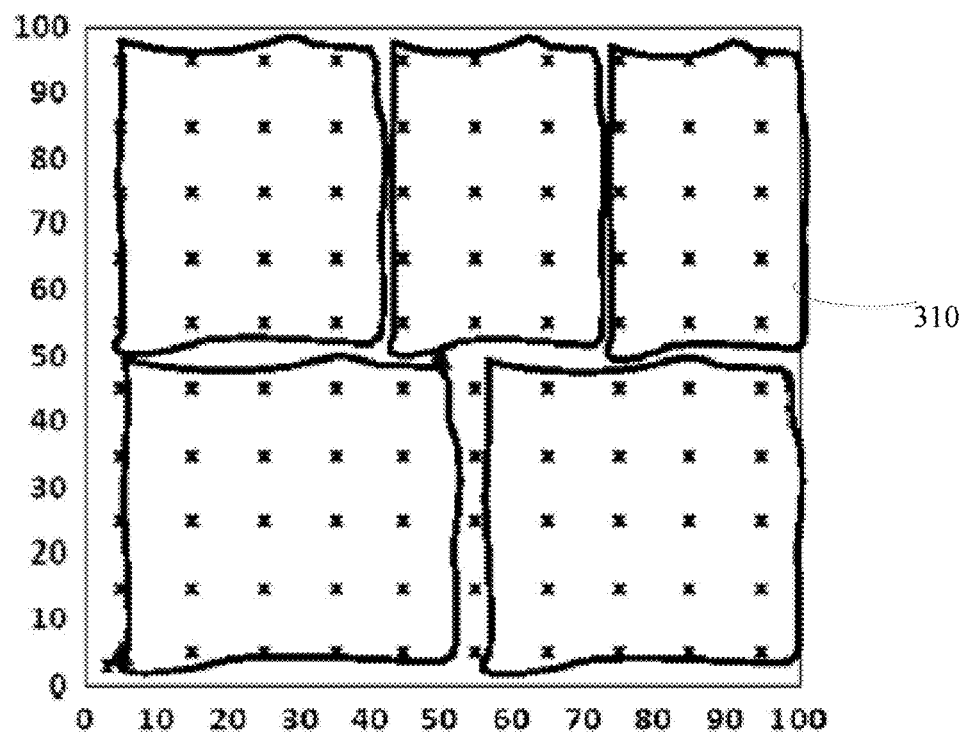
FIGS. 3A-3D illustrate according to an embodiment sensor node deployment for different distributions.
Figure 3B:
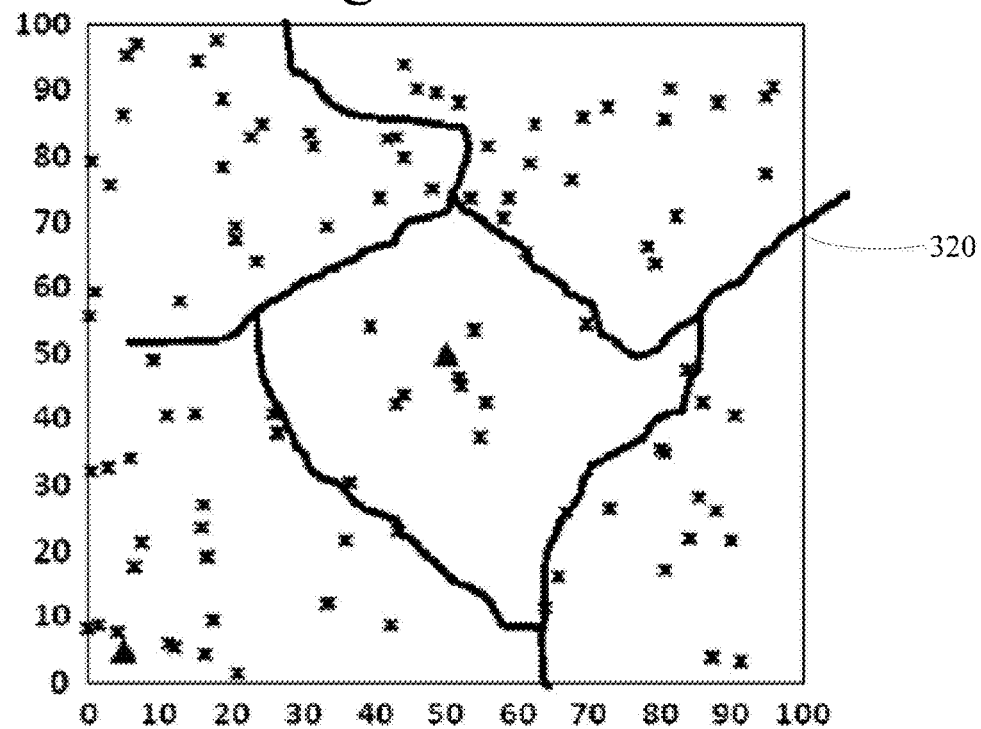
Figure 3C:
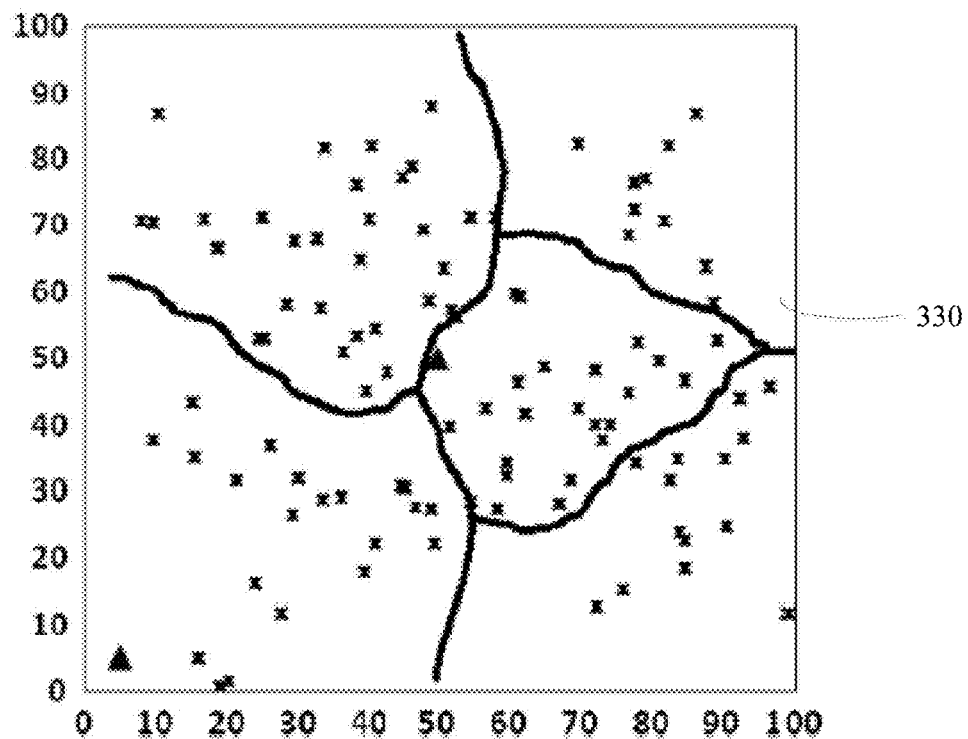
Figure 3D:
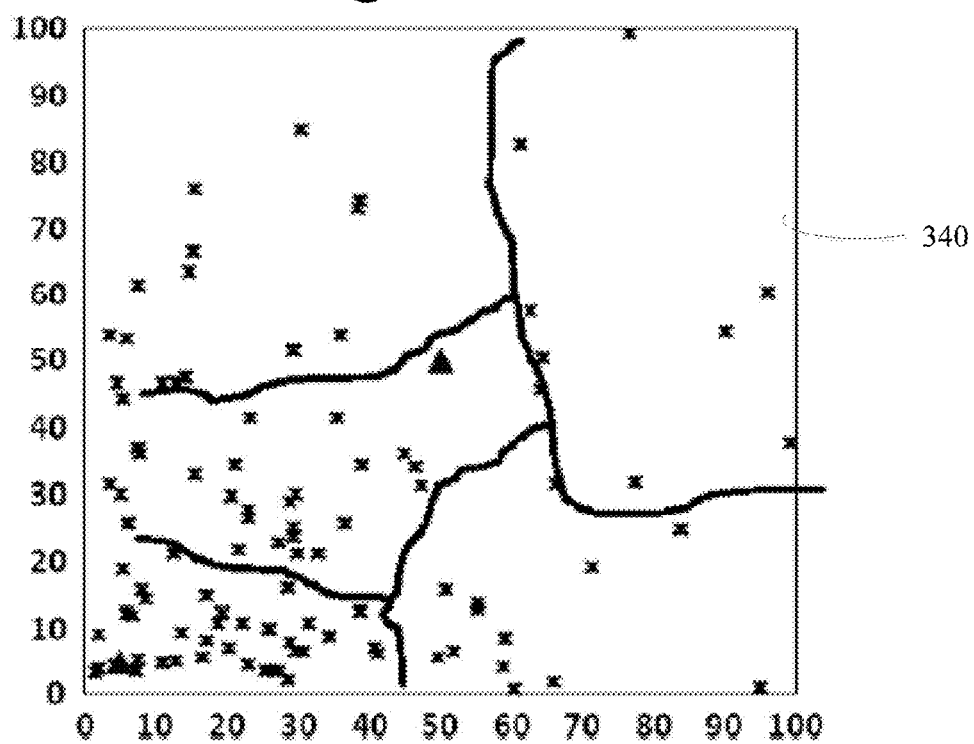

Table IV shows that the location of base station plays a key role in the overall performance. Tables IV and V illustrate the performance comparison for the three deployment strategies (Normal, Grid and Exponential) compared with uniform deployment strategy for LEACH and LEACH-C, respectively. It can be observed that there is a performance discrepancy between LEACH and LEACH-C. For LEACH, grid topologies have shown the best energy utilization compared to other random distributions when the base station is located at the corner of the monitored area, while it shows the worst performance when the base station is located in the center except when the number of nodes is 200. This result can be explained as follows: since LEACH is a localized approach and the grid topology inherently has a balanced structure, the local decision on selecting the cluster head node and its children is optimized compared to uniformly distributed nodes which may force LEACH to build unbalanced clusters as shown in FIG. 3B. Accordingly, locating the base station node near the center of the monitored area will be in favor of uniformly distributed nodes that leads into higher throughput per joule compared to grid distributed nodes. Consider the case of exponentially distributed topologies, locating the base station at the corner of the network shows a clear improvement compared to uniform distribution. This result is expected as most of the nodes are concentrated at the corner as shown in FIG. 2($d$). However, the result is for the case of normally distributed topologies illustrates outstanding performance when the base station is located at the corner for 50 and 150 topologies. These results indicate the huge impact the assumed topology distribution has on the energy utilization. In addition, these results show the instable performance of LEACH.

TABLE V

Performance improvement in LEACH-C.

| | Exponential | | Normal | | Grid | |
|---|---|---|---|---|---|---|
| No. of nodes | CrBS | CnBS | CrBS | CnBS | CrBS | CnBS |
| 50 | 39% | 1% | 42% | −9% | −64% | 0% |
| 100 | 34% | −1% | 44% | −13% | −73% | 0% |
| 150 | 37% | −1% | 43% | −18% | −64% | −1% |
| 200 | 55% | −20% | 35% | −18% | −70% | 11% |
| 250 | 19% | −3% | 23% | −24% | −87% | 0% |

LEACH-C - Improvement compared to uniform deployment;
CrBS: the base station is located in the corner,
CnBS: the base station is located in the corner.

Again, LEACH-C illustrates its superiority compared to LEACH when we compare different topologies against the location of the base station node. On one hand, we can observe consistent improvement for normally and exponentially distributed topologies when the base station is located in the corner. On the other hand, the grid topology performance degraded severely and it even showed lower than LEACH in terms of packet per joule. In addition, when the base station is placed at the center, LEACH-C seems to be optimized for uniformly distributed topologies and other topologies show no improvement or even lower performance. These results show the importance of carefully selecting the topology and the deployed routing protocol.

In the above embodiment, it was assumed that the sensor node always has data to transmit. Nonetheless, in real life applications, this assumption might not be true where the data rate varies from node to node based on several reasons such as the monitored event, and the monitored area. For example, in surveillance applications, sensor nodes do not send anything unless an object intruding the monitored area is detected. According to one embodiment, we consider variable data rate for sensor nodes, and study the performance of LEACH and LEACH-C for four different data rates. In our simulation experiments, we mimic the data rate variation by forcing a number of nodes corresponding to the actual data rate to sleep during their reserved TDMA slots. Hence, we expect LEACH routing protocol not to perform well since many slots will not be utilized while the cluster head node is active waiting for data to be received.

FIGS. 7A-7D depicts exemplary graphs 710-740 depicting average packet energy for different data rates for LEACH and LEACH-C. In FIGS. 7A-7D, the curves 701, 721, 731 and 741 correspond to 100% data rate, curves 703, 723, 733, and 743 correspond to 75% data rate, curves 705, 725, 735, and 745 correspond to 50% data rate, and the curves 707, 727, 737 and 747 correspond to 25% data rate respectively.

Figure 7A:
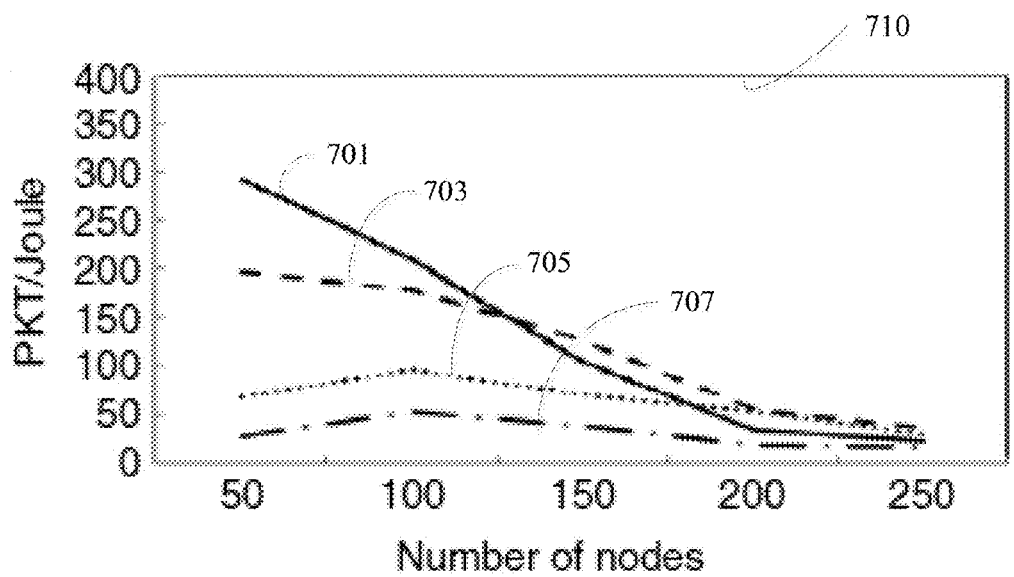
FIGS. 7A-7D depicts exemplary graphs depicting average packet energy for different data rates for LEACH and LEACH-C.
Figure 7B:
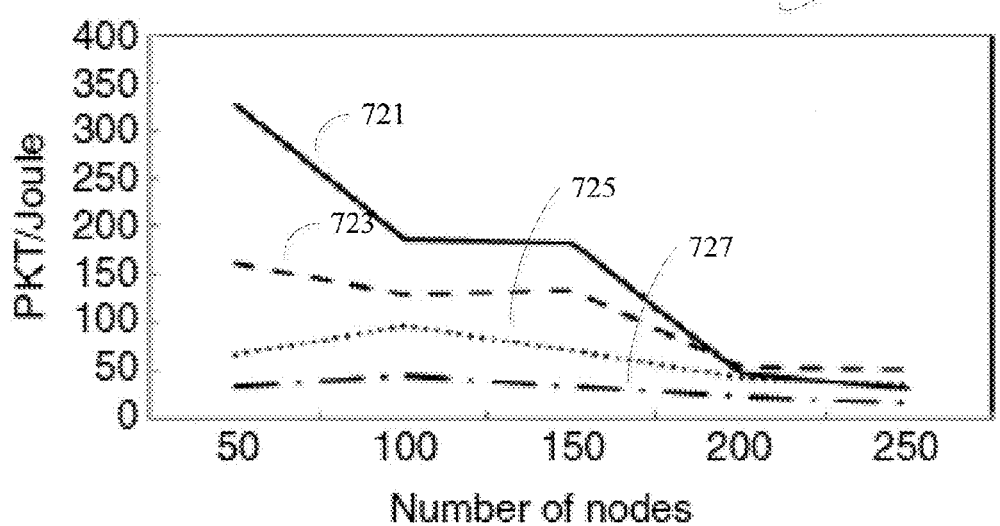
Figure 7C:
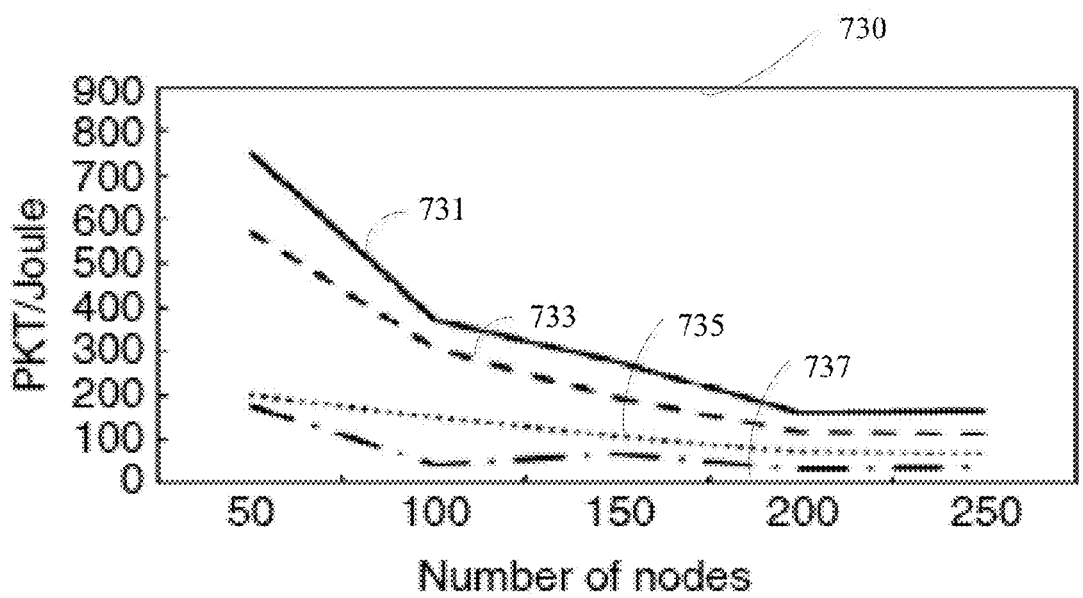
Figure 7D:
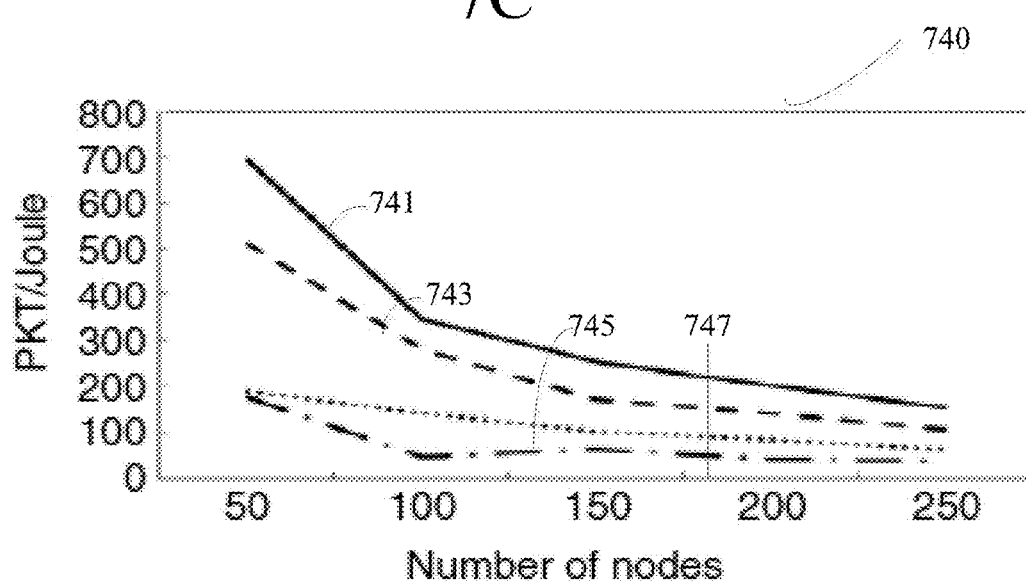

FIGS. 7A and 7B depict the performance of LEACH for exponentially distributed topologies under different data rates. Similarity, FIGS. 7C and 7D show the energy consumption efficiency under LEACH-C for centered base station and cornered base station, respectively. LEACH-C behaves in a similar manner compared to LEACH but LEACH-C is more consistent and that is obvious from the results in Table 7, where there is no presence for negative signs.

It can be observed that there is a high drop in derived data compared to 100% activity case. Of course, as the node is only 25% active, we may expect the delivered data to drop by 75%. However, the actual drop is about 90%. Again, as we noted above that LEACH can behave unpredictably. For example, for the case of 75% activity and the base station is located in the center, the delivered packet per joule is higher than the 150% case. This behavior is depicted in Table VI by the negative signs.

From Tables VI and VII, we can observe the following. First, in general, the data drop for centered base station is worse than the case when the base station is located in the corner. Second, the higher the number of nodes in the monitored area, the lower is the drop in received data. This result could be explained as follows. We have shown in the previous figures as when the number of nodes increases the energy utilization efficiency decreases due to the high likelihood of collision. Now, when we decrease the data rate, we actually have decreased the overall activity of the network and hence, less collision would occur. Therefore, the energy utilization efficiency is expected to be increased and this is what has been shown in Tables VI and VII.

TABLE VI efficiency drop compared to 100% in LEACH for exponential distribution.
Drop in efficiency compared to 100% under LEACH with different data rates and exponential sensor nodes deployment.

| | Data rate 25% | | Data rate 50% | | Data rate 75% | |
|---|---|---|---|---|---|---|
| No. of nodes | CrBS | CnBS | CrBS | CnBS | CrBS | CnBS |
| 50 | 90% | 91% | 80% | 76% | 51% | 33% |
| 100 | 77% | 75% | 48% | 53% | 32% | 15% |
| 150 | 82% | 64% | 61% | 33% | 28% | −20% |
| 200 | 53% | 46% | 11% | −61% | −13% | −66% |
| 250 | 52% | 26% | −13% | −29% | −58% | −62% |

TABLE VII efficiency drop compared to 100% in LEACH-C
for exponential distribution.
Drop in efficiency compared to 100% under LEACH-C with different data rates and exponential sensor nodes deployment.

| | Data rate 25% | | Data rate 50% | | Data rate 75% | |
|---|---|---|---|---|---|---|
| No. of nodes | CrBS | CnBS | CrBS | CnBS | CrBS | CnBS |
| 50 | 75% | 77% | 73% | 73% | 26% | 24% |
| 100 | 87% | 88% | 59% | 59% | 19% | 17% |

TABLE VII-continued efficiency drop compared to 100% in LEACH-C
for exponential distribution.
Drop in efficiency compared to 100% under LEACH-C with
different data rates and exponential sensor nodes deployment.

| No. of nodes | Data rate 25% | | Data rate 50% | | Data rate 75% | |
|---|---|---|---|---|---|---|
| | CrBS | CnBS | CrBS | CnBS | CrBS | CnBS |
| 150 | 75% | 76% | 61% | 61% | 33% | 30% |
| 200 | 80% | 79% | 58% | 56% | 28% | 28% |
| 250 | 77% | 76% | 60% | 58% | 33% | 31% |

Figure 8:
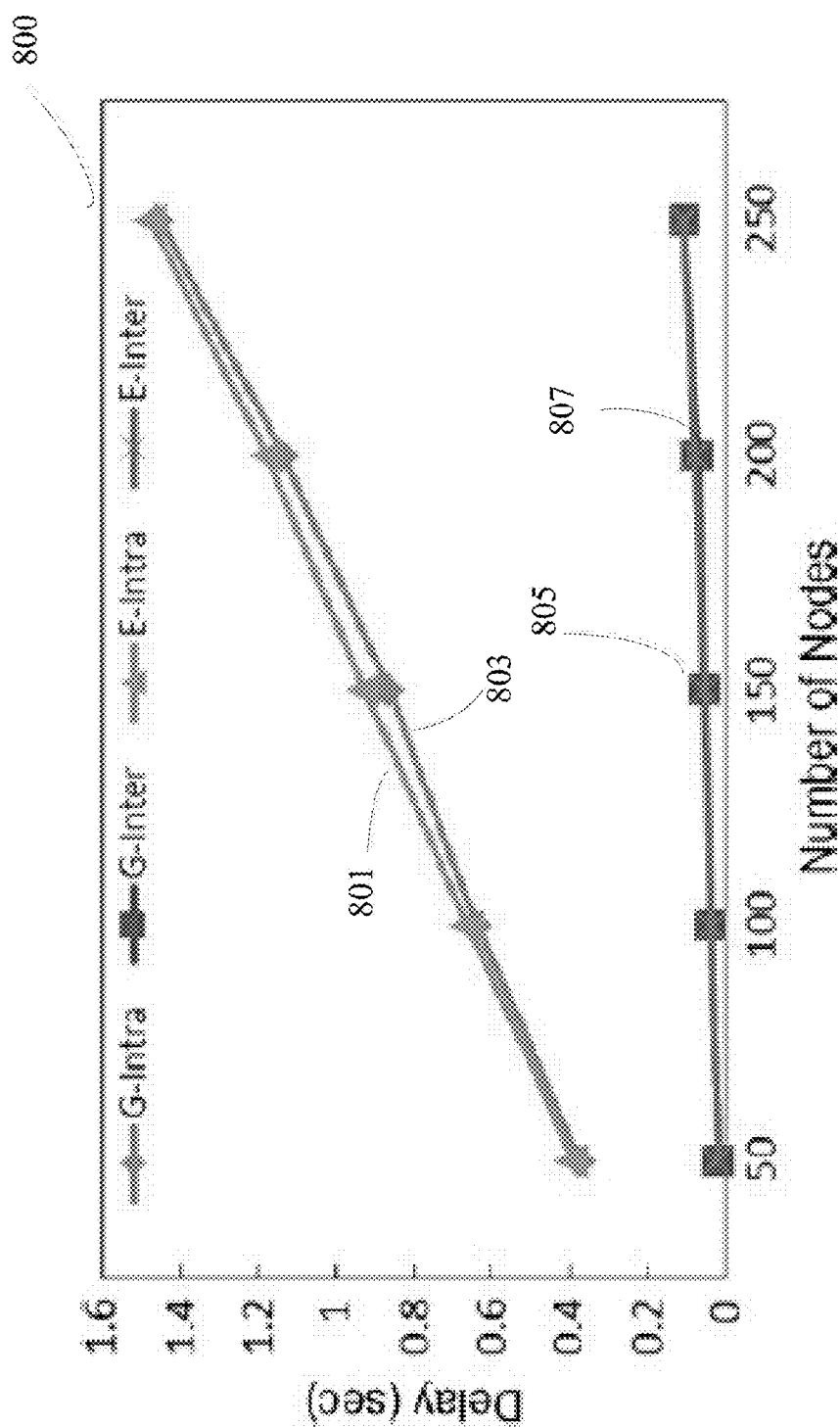
FIG. 8 depicts according to an embodiment, an exemplary graph illustrating average inter and intra-cluster delay for different sensor distributions.

In what follows is described the delay simulation results for the average delay followed by the delay behavior for the different distributions. FIG. 8 depicts according to an embodiment, an exemplary graph 800 illustrating average inter and intra-cluster delay for different sensor distributions. The curves 801, 803, 805 and 807 correspond to the performance of exponential distribution-intra cluster delay, grid distribution-intra cluster delay, grid distribution-inter cluster delay, and exponential distribution-inter cluster delay respectively.

FIG. 8 shows the difference of inter-cluster and intra-cluster delays in case of 5% number of cluster heads. As discussed previously, the inter-cluster delay is smaller than intra-cluster delay in case of small percentage of cluster heads, since lower rate of collision is expected. As the network becomes denser, the interference increases, thereby collisions increase; that it is clearly illustrated by FIG. 8 where the delays of both inter and intra increase as number of nodes increases. The delay increment of intra-cluster is slower than inter because of the collision free nature of TDMA, used in intra-cluster scheduling. Moreover, the grid distribution slightly outperforms exponential distribution in case of inter-cluster delay due to it is deterministic behavior.

Figure 9:
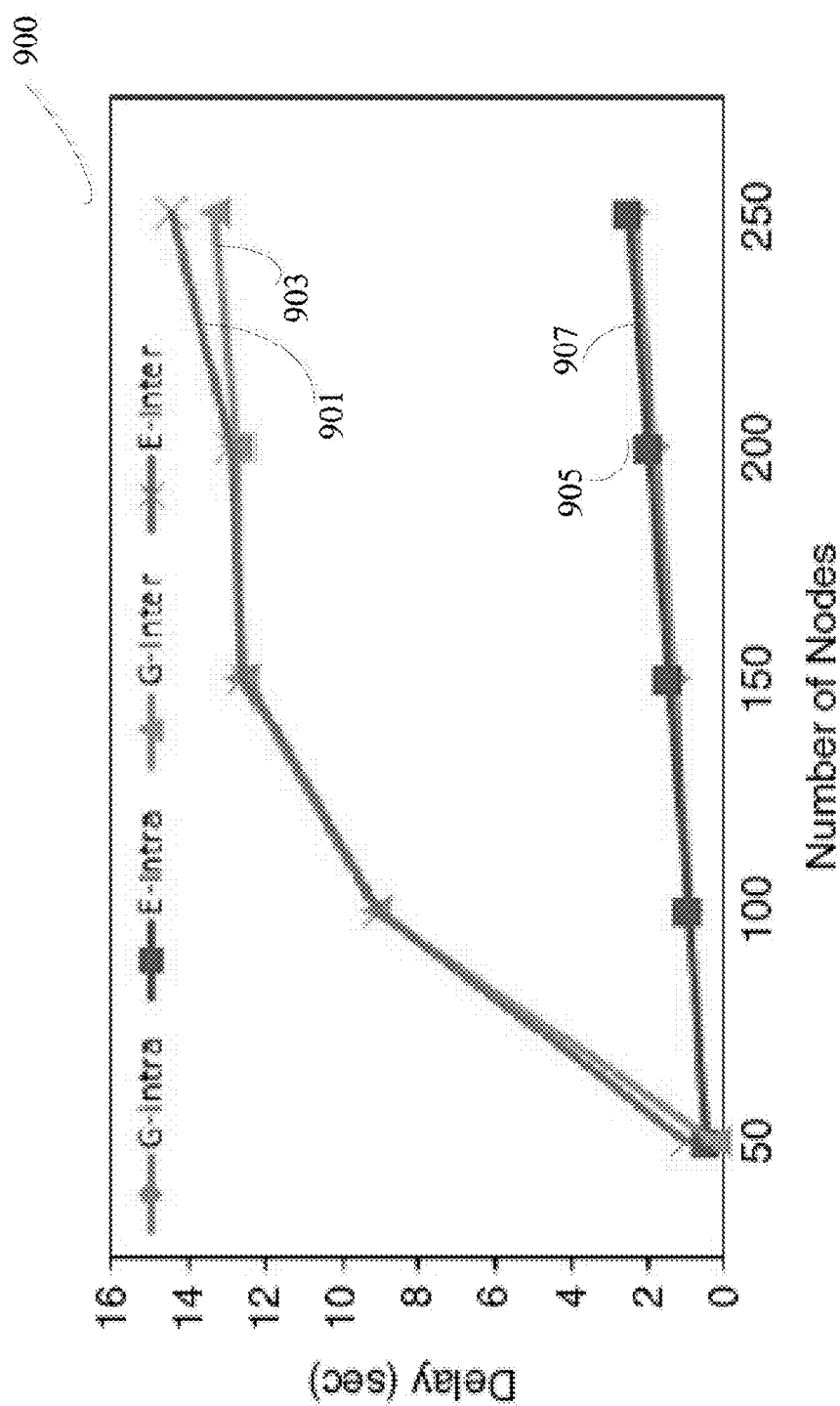
FIG. 9 depicts according to another embodiment, an exemplary graph illustrating average inter and intra-cluster delay for different sensor distributions.

FIG. 9 depicts according to another embodiment, an exemplary graph 900 illustrating average inter and intra-cluster delay for different sensor distributions. The curves 901, 903, 905 and 907 correspond to the performance of exponential distribution-inter cluster delay, grid distribution-inter cluster delay, exponential distribution-intra cluster delay, and gris distribution-intra cluster delay respectively.

FIG. 9 shows the effect of increasing the number of cluster heads on both the intra-cluster and inter-cluster delays. The impact is significant in case of inter delay due to increasing collision probability as number of cluster heads increases. It is interesting to note that the situation is reversed compared to 5% and the inter delay is much greater than the intra delay components. And still the grid distribution shows better performance than exponential distribution. In contrast to FIG. 8, this figure shows significant increasing of inter delay where it reaches approximately 14 s (unacceptable delay on critical and real time systems) in case of 250 nodes. From both figures, we can see the effect of increasing the number of cluster heads; where the inter delay has the major effect when it turns from very low such as 0.3 s in case of 50 nodes with 5% cluster heads, into very high delay in case of 20% cluster heads, where it reaches exactly 14.4 s in case of 250 nodes with exponential distribution. As discussed before that result reflects the problem of CSMA in case of inter-cluster communication due to its random back-off and high contention period.

Having discussed the average delay performance for both inter-cluster delay and intra-cluster delay, it is observed that LEACH-C has performed better in balancing the delay among all nodes and clusters. However, the real time applications are concerned more with the instantaneous behavior of the individual node or cluster. Therefore, using the cumulative distribution function (CDF), is described herein below, the statistical behavior of both delay components (i.e. inter and intra) based on the collected samples from all random topologies.

Figure 10:
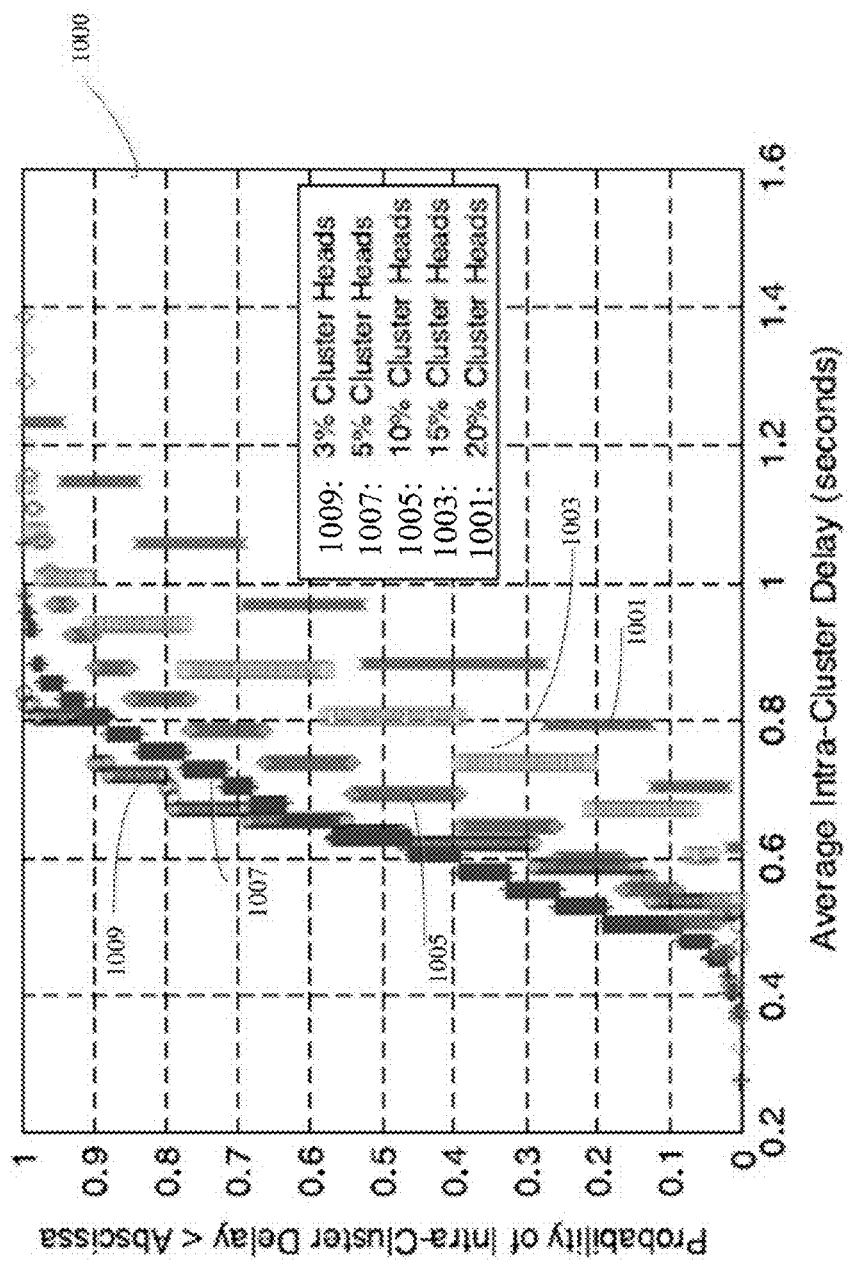
FIG. 10 depicts a graph illustrating intra-cluster delay cumulative distribution function (CDF) according to an embodiment.
Figure 11:
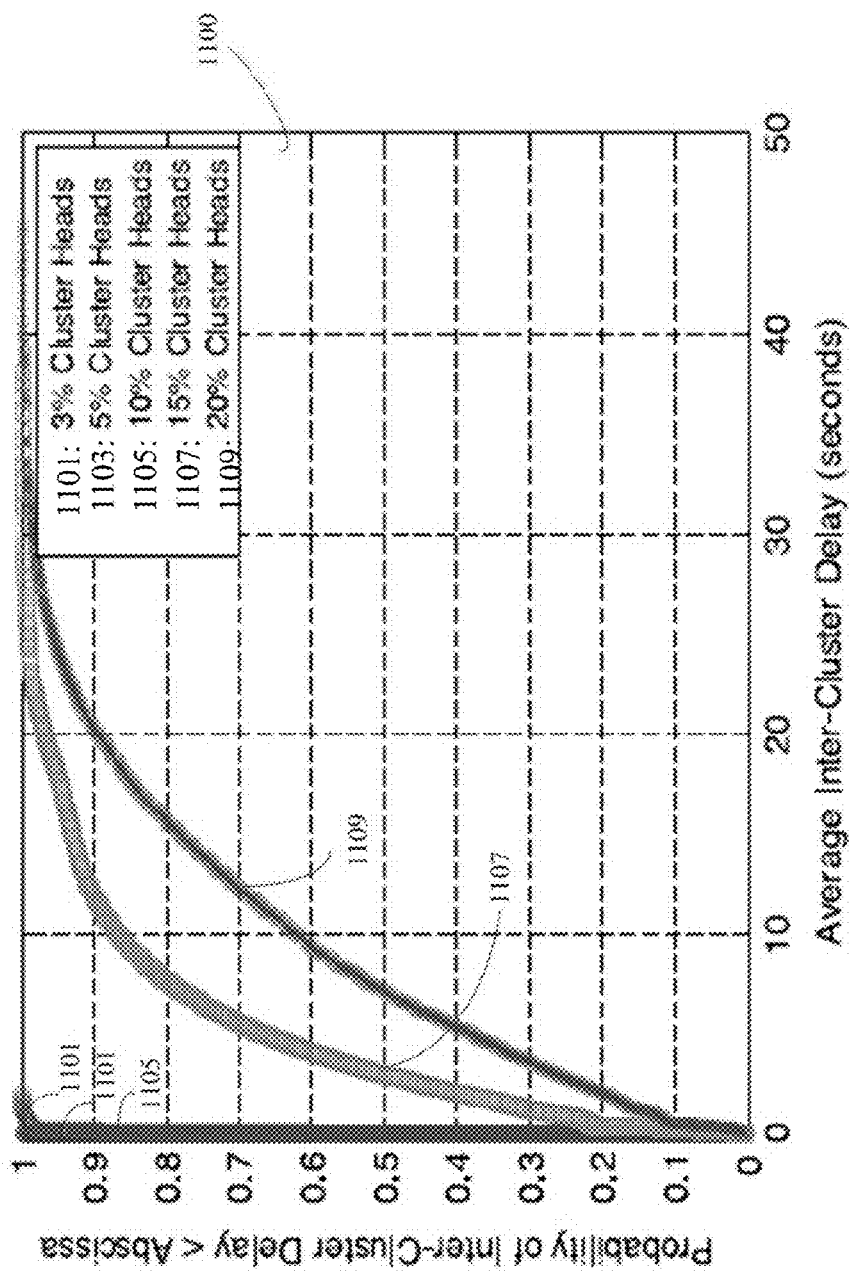
FIG. 11 depicts according to an embodiment, an exemplary graph illustrating inter-cluster delay CDF.
Figure 12:
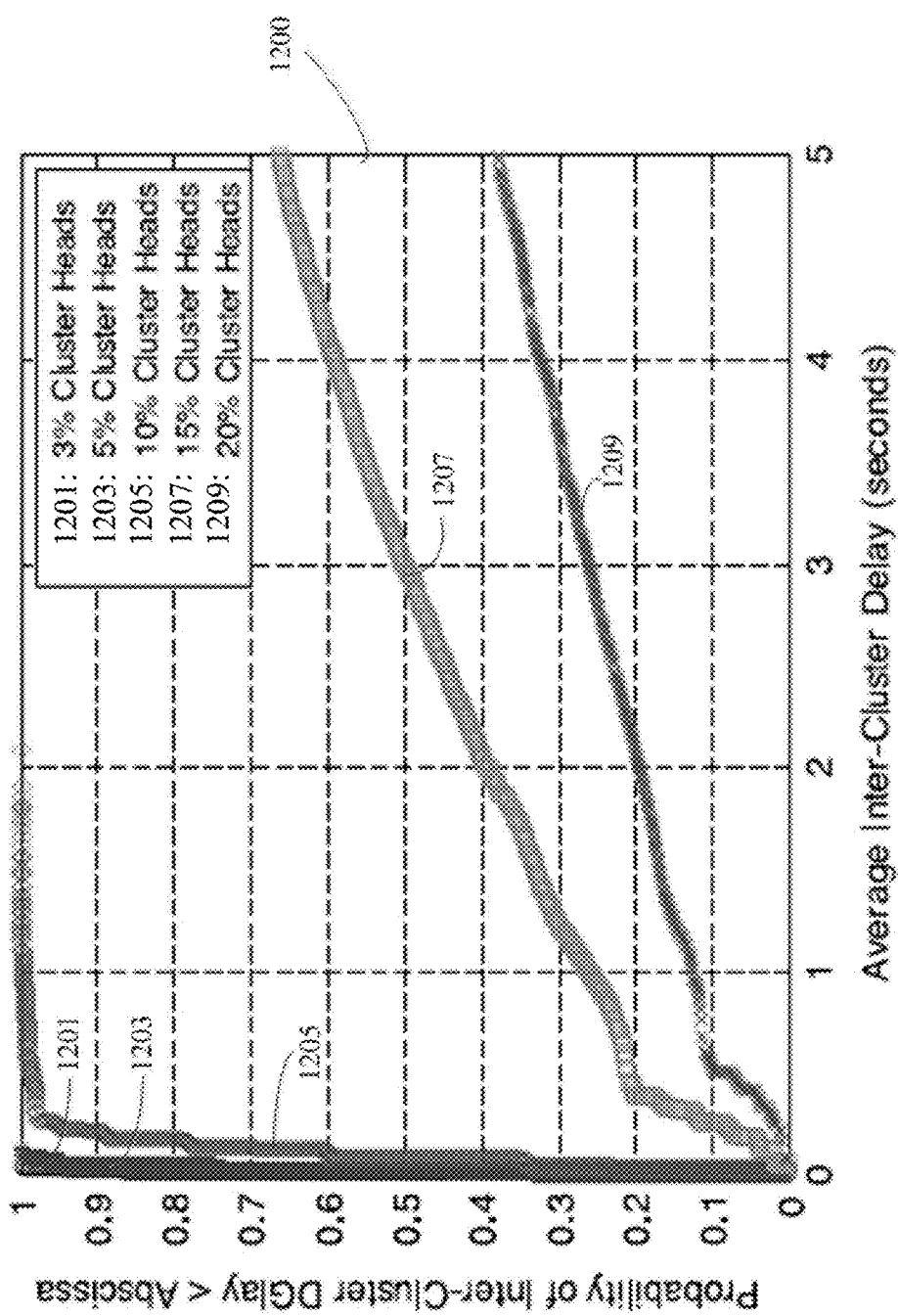
FIG. 12 depicts a zoomed version of the inter-cluster CDF of FIG. 11.

Considering FIGS. 10-12, we make the following observations. Firstly, the intra-cluster delay is limited to 1.4 s while the inter-cluster delay can extend as long as 45 s for large number of cluster heads. Secondly, the delay relation is not linear with respect to the number of cluster heads. This is clearly shown in FIGS. 11 and 12 where for the case of 3% and 5% cluster heads, the inter delay does not exceed 0.2 s, while for 15% and 20%, the inter delay is greater than 10 s for about 10% and 40% of the simulation time, respectively.

Third, for both delay components, we can notice that the larger the number of cluster heads, the larger is the delay. This result especially for the intra-cluster delay may contradict the discussion above where we argued that the smaller the cluster heads, the larger is the intra-delay. Here, it is worth to remind the reader that in LEACH and LEACH-C, the spreading factor is proportional to the number of cluster heads. Hence, the TDMA slot will increase proportional to the number of cluster heads. In fact, this conservative design would lead to excessive delay that will affect drastically the real time applications such as security applications.

Figure 13:
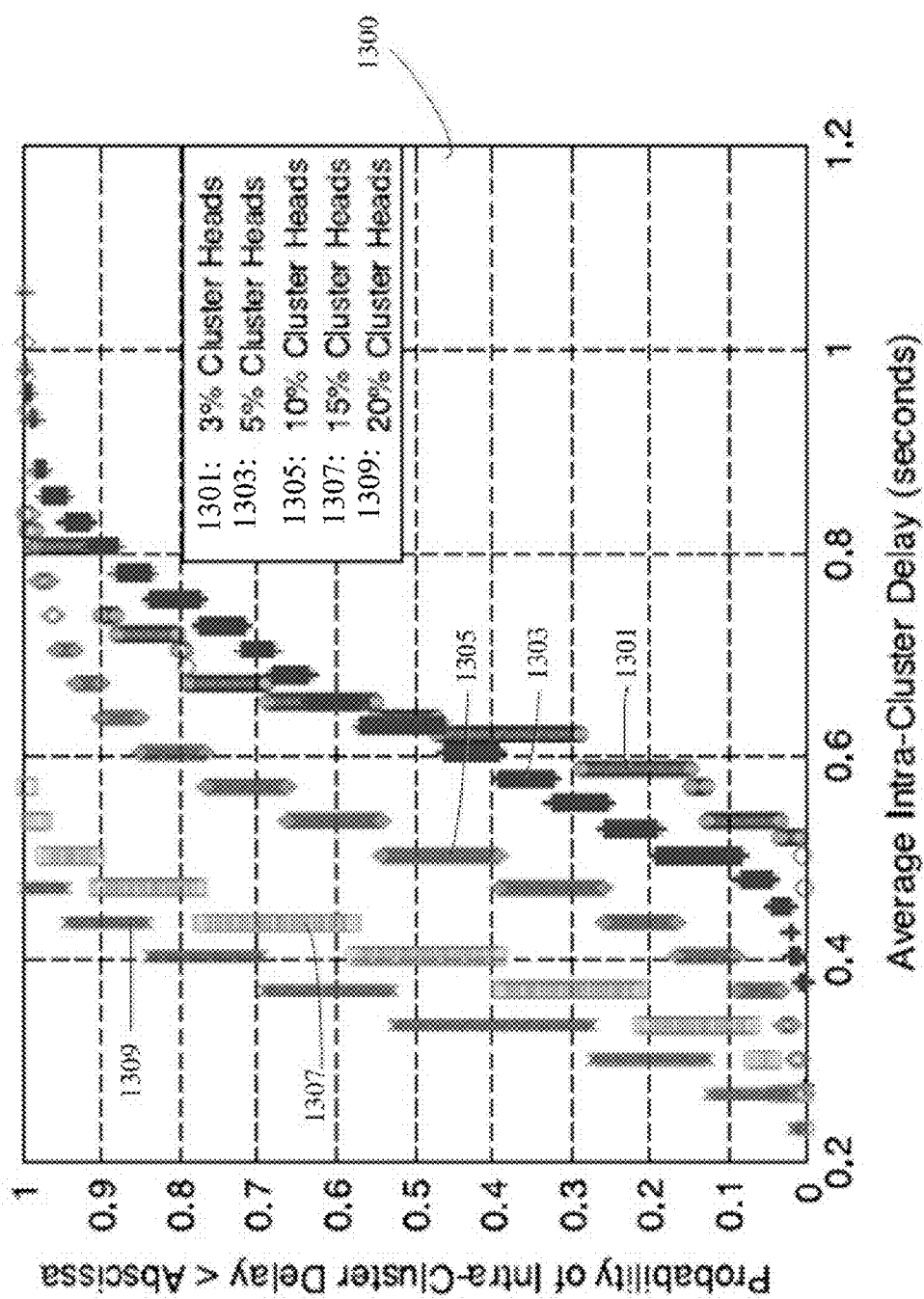
FIG. 13 depicts a graph illustrating intra-cluster CDF corresponding to a fixed spreading factor.

Accordingly, by one embodiment, the spreading factor is fixed to 8 for the 10%, 15% and 20% cases, while we keep it as is for 3% and 5%. FIG. 13 illustrates the new CDF results. It is clear that the situation is the opposite of what is depicted in FIG. 10 and the minimum intra-cluster delay occurs at 20% case. In addition, the maximum intra-cluster delay for all cases does not exceed 1.2 s compared to 3 on the original LEACH. However, the inter delay is still increasing as the number of cluster heads increases and this is due to the CSMA protocol.

The huge demand for efficient and practical deployment of wireless sensor networks pushes towards revisiting the existing protocols looking for better understanding and novel solutions. The above embodiments is one step in this direction where the impact of different sensor nodes deployments is evaluated and the behavior of routing protocols such as LEACH and LEACHC is characterized. Furthermore, embodiments described herein investigate the performance of LEACH and LEACH-C for different data rate availability which emulates real applications where there is no exhaustive data transmission. Furthermore, the above embodiment investigate the cluster formation effect on the overall system delay and we discussed the relationship between the inter-cluster delay, the intra-cluster delay and the system parameters such as the number of cluster heads and spreading factor.

Figure 14:
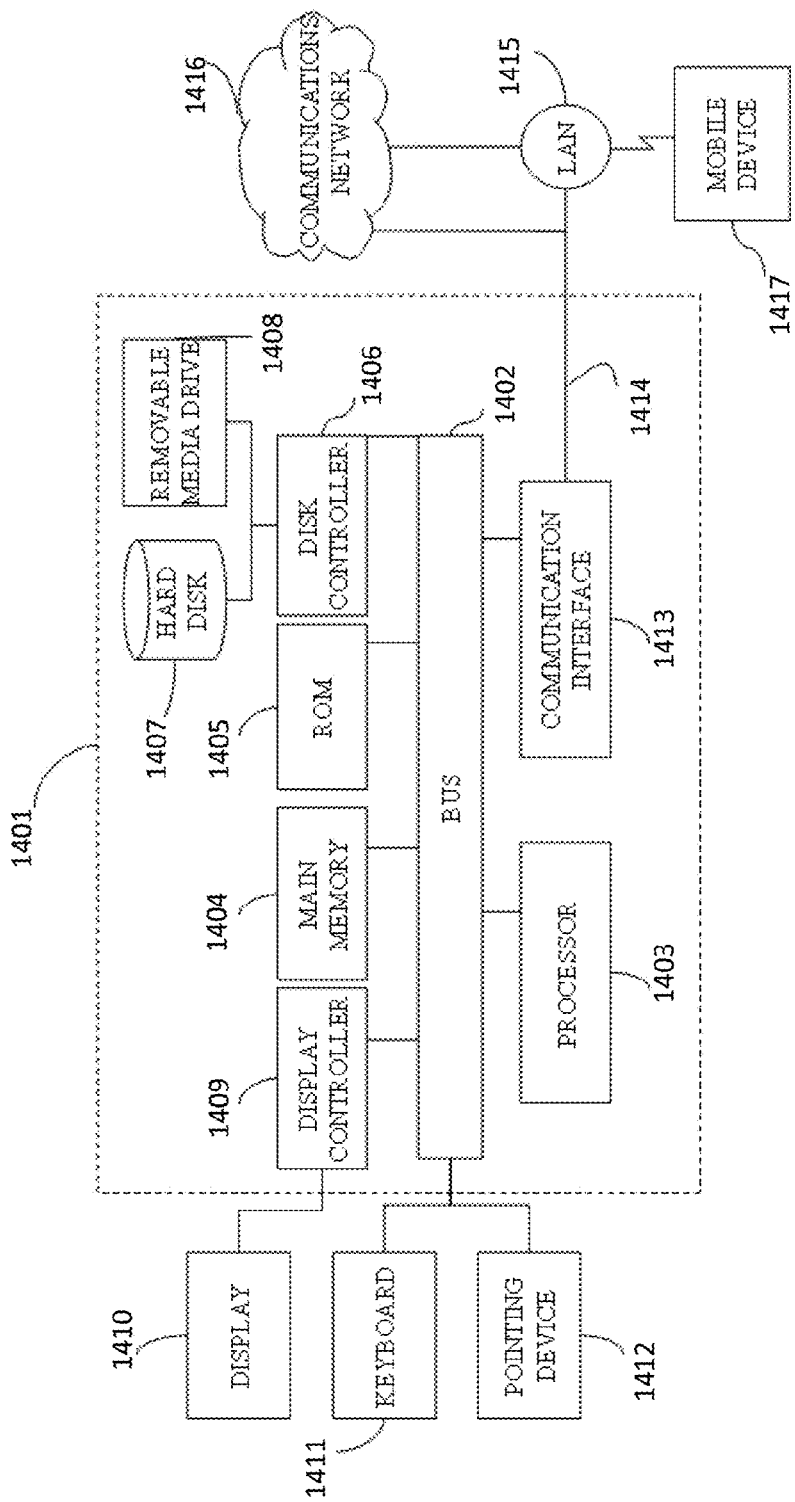
FIG. 14 illustrates an exemplary block diagram of a computing device.

Each of the functions of the described embodiments may be implemented by one or more processing circuits. A processing circuit includes a programmed processor (for example, processor 1403 in FIG. 14), as a processor includes circuitry. A processing circuit also includes devices such as an application-specific integrated circuit (ASIC) and circuit components arranged to perform the recited functions The various features discussed above may be implemented by a computer system (or programmable logic). FIG. 14 illustrates such a computer system 1401.

The computer system 1401 includes a disk controller 1406 coupled to the bus 1402 to control one or more storage devices for storing information and instructions, such as a magnetic hard disk 1407, and a removable media drive 1408

(e.g., floppy disk drive, read-only compact disc drive, read/write compact disc drive, compact disc jukebox, tape drive, and removable magneto-optical drive). The storage devices may be added to the computer system 1401 using an appropriate device interface (e.g., small computer system interface (SCSI), integrated device electronics (IDE), enhanced-IDE (E-IDE), direct memory access (DMA), or ultra-DMA).

The computer system 1401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1401 may also include a display controller 1409 coupled to the bus 1402 to control a display 1410, for displaying information to a computer user. The computer system includes input devices, such as a keyboard 1411 and a pointing device 1412, for interacting with a computer user and providing information to the processor 1403. The pointing device 1412, for example, may be a mouse, a trackball, a finger for a touch screen sensor, or a pointing stick for communicating direction information and command selections to the processor 1403 and for controlling cursor movement on the display 1410.

The processor 1403 executes one or more sequences of one or more instructions contained in a memory, such as the main memory 1404. Such instructions may be read into the main memory 1404 from another computer readable medium, such as a hard disk 1407 or a removable media drive 1408. One or more processors in a multi-processing arrangement may also be employed to execute the sequences of instructions contained in main memory 1404. In alternative embodiments, hard-wired circuitry may be used in place of or in combination with software instructions. Thus, embodiments are not limited to any specific combination of hardware circuitry and software.

As stated above, the computer system 1401 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1401, for driving a device or devices for implementing the invention, and for enabling the computer system 1401 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1403 for execution. A computer readable medium may take many forms, including but not limited to, non-volatile media or volatile media. Non-volatile media includes, for example, optical, magnetic disks, and magneto-optical disks, such as the hard disk 1407 or the removable media drive 1408. Volatile media includes dynamic memory, such as the main memory 1404. Transmission media, on the contrary, includes coaxial cables, copper wire and fiber optics, including the wires that make up the bus 1402. Transmission media also may also take the form of acoustic or light waves, such as those generated during radio wave and infrared data communications.

Various forms of computer readable media may be involved in carrying out one or more sequences of one or more instructions to processor 1403 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1401 may receive the data on the telephone line and place the data on the bus 1402. The bus 1402 carries the data to the main memory 1404, from which the processor 1403 retrieves and executes the instructions. The instructions received by the main memory 11404 may optionally be stored on storage device 1407 or 1408 either before or after execution by processor 1403.

The computer system 1401 also includes a communication interface 1413 coupled to the bus 1402. The communication interface 1413 provides a two-way data communication coupling to a network link 1414 that is connected to, for example, a local area network (LAN) 1415, or to another communications network 1416 such as the Internet. For example, the communication interface 1413 may be a network interface card to attach to any packet switched LAN. As another example, the communication interface 1413 may be an integrated services digital network (ISDN) card. Wireless links may also be implemented. In any such implementation, the communication interface 1413 sends and receives electrical, electromagnetic or optical signals that carry digital data streams representing various types of information.

The network link 1414 typically provides data communication through one or more networks to other data devices. For example, the network link 1414 may provide a connection to another computer through a local network 1415 (e.g., a LAN) or through equipment operated by a service provider, which provides communication services through a communications network 1416. The local network 1414 and the communications network 1416 use, for example, electrical, electromagnetic, or optical signals that carry digital data streams, and the associated physical layer (e.g., CAT 5 cable, coaxial cable, optical fiber, etc.). The signals through the various networks and the signals on the network link 1414 and through the communication interface 1413, which carry the digital data to and from the computer system 1401 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1401 can transmit and receive data, including program code, through the network(s) 1415 and 1416, the network link 1414 and the communication interface 1413. Moreover, the network link 1414 may provide a connection through a LAN 1415 to a mobile device 1417 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

What is claimed is:

1. A method of operating a computer system to determine the performance of a wireless sensor network including a plurality of sensors, the method comprising:
   selecting, a sensor distribution pattern for a geographical region where the sensors are to be deployed; determining a location for a base station in the geographical region;
   generating by circuitry, a plurality of sensor clusters, each sensor cluster of the plurality of sensor clusters being formed by one of a first grouping mechanism and a second grouping mechanism, the first grouping mechanism forming the sensor cluster based on a strength of a signal transmitted by each sensor, that is received by the base station, and the second grouping mechanism forming the sensor cluster based on a location of the sensor and an energy level of the sensor;
   allocating, for each sensor included in the generated sensor cluster, a time-slot within a time-frame corresponding to the sensor cluster, the time-slot being utilized for transmitting a data packet from the sensor to the base station; and
   evaluating by the circuitry, the performance of the first grouping mechanism and the second grouping mechanism for the selected sensor distribution pattern and base station location, by computing at least a ratio of delivered data packets to the base station to a total energy consumption, and a first delay and a second delay incurred by each data packet, wherein the first delay is an average intra-cluster delay of from 0.2 to 1 second and the second delay is an average inter-cluster delay of less than 20 seconds,
   wherein the selected sensor distribution pattern is a grid pattern wherein the sensors are disposed in a manner such that a distance between adjacent sensors is a predetermined distance, in a normal distribution pattern a principle number of sensors are disposed in the center of the geographical region, and in a exponential distribution pattern, a principle number of sensors are disposed in the corner of the geographical region.

2. The method according to claim 1, wherein the location for the base station in the geographical region is one of a center of the geographical region, and a corner of the geographical region.

3. The method according to claim 1, wherein the generating step further comprises:
   computing by the circuitry, for the second grouping mechanism, an average sensor energy corresponding to the sensors in the geographical region; generating a non-cluster sensor group including sensors that have energy lower than the computed average sensor energy; and forming the sensor clusters based on a simulated annealing algorithm.

4. The method according to claim 1, further comprising:
   assigning for each generated sensor cluster, a cluster-head sensor, the cluster head sensor receiving data from other sensors in the sensor cluster and transmitting the received data to the base station.

5. The method according to claim 3, wherein the forming step further comprises:
   minimizing a total sum of squared distances between sensors included in the non-cluster sensor group and their respective cluster head-sensor.

6. The method according to claim 1; further comprising:
   re-assigning by the circuitry, after a predetermined time-interval, for each generated sensor cluster, the cluster head-sensor.

7. The method according to claim 1, wherein the evaluating step further comprises:
   determining, for each sensor in the geographical region, availability of data to be transmitted to the base station; and de-activating the sensor in its allocated time-slot based on no data being available for transmission to the base station in the time-slot.

* * * * *